United States Patent [19]
Iwaki et al.

[11] Patent Number: 5,309,523
[45] Date of Patent: May 3, 1994

[54] OPTICAL PATTERN RECOGNITION APPARATUS

[75] Inventors: Tadao Iwaki; Yasuyuki Mitsuoka, both of Tokyo, Japan

[73] Assignee: Seiko Instruments Inc., Japan

[21] Appl. No.: 931,893

[22] Filed: Aug. 18, 1992

Related U.S. Application Data

[63] Continuation of Ser. No. 539,725, Jun. 15, 1990.

[30] Foreign Application Priority Data

| Jun. 16, 1989 | [JP] | Japan | 1-155224 |
| Jun. 29, 1989 | [JP] | Japan | 1-167758 |
| Sep. 22, 1989 | [JP] | Japan | 1-247612 |
| Jan. 12, 1990 | [JP] | Japan | 2-5241 |
| Jan. 12, 1990 | [JP] | Japan | 2-5246 |

[51] Int. Cl.$^5$ .................. G06F 15/336; G06K 9/64
[52] U.S. Cl. .................. 382/42; 382/43; 382/31; 382/32; 364/822; 359/561
[58] Field of Search .................. 382/42, 43, 31, 32; 364/822; 359/561

[56] References Cited

U.S. PATENT DOCUMENTS

| 3,729,634 | 3/1973 | Jensen et al. | 350/162.12 |
| 3,851,308 | 11/1974 | Kawasaki et al. | 382/31 |
| 4,462,046 | 7/1984 | Spight | 382/42 |
| 4,556,986 | 12/1985 | Craig | 382/42 |
| 4,695,973 | 9/1987 | Yu | 364/819 |
| 4,832,447 | 12/1987 | Javidi | 350/162.13 |
| 4,958,376 | 9/1990 | Leib | 382/31 |
| 4,961,615 | 10/1990 | Owechko et al. | 350/162.13 |

FOREIGN PATENT DOCUMENTS 0152186 8/1985 European Pat. Off.

OTHER PUBLICATIONS

T. Iwaki et al., "Optical pattern recognition with LAPS-SLM (II)/feedback joint transform correlator using LAPS-SLM", Proceedings of the SPIE Conference:- Computer and Optically Formed Holographic Optics, vol. 1211, Jan. 15, 1990, pp. 284-295.

Primary Examiner—Michael T. Razavi
Assistant Examiner—Jon Chang
Attorney, Agent, or Firm—Bruce L. Adams; Van C. Wilks

[57] ABSTRACT

In a joint transform correlator utilizing a spatial optic modulator, depending on the light intensity of each correlation peak obtained from optical correlation processing between at least one reference image and at least one input image, the light intensity passing through each reference image corresponding to each correlation peak is substantially adjusted so as to constitute a feedback system. By such construction, when processing a relatively large number of input or reference images, the correlator can avoid failure of recognition due to the reduction of light intensity of the correlation peaks and can avoid erroneous recognition to enable fast pattern recognition.

27 Claims, 17 Drawing Sheets

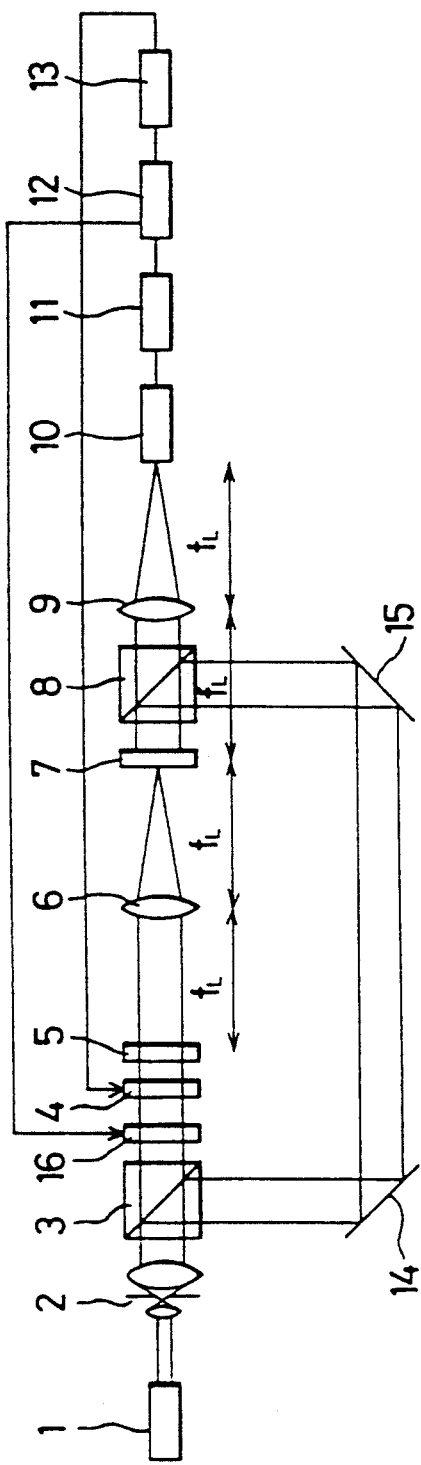
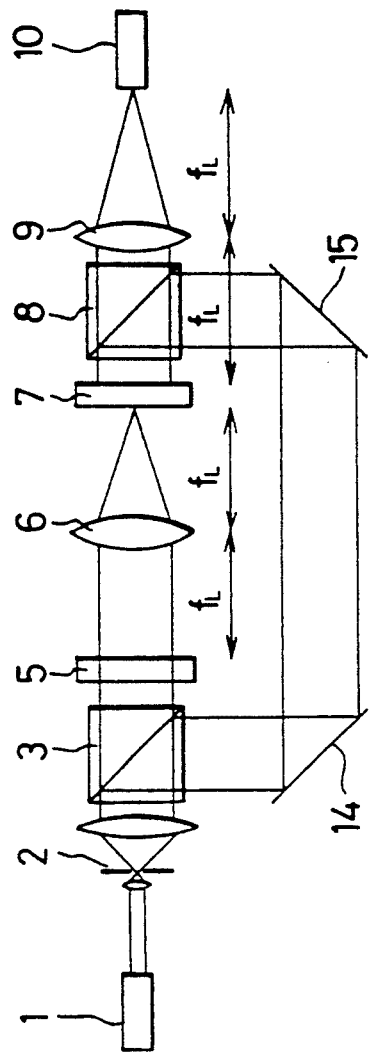
FIG. 1
FIG. 2 PRIOR ART

JOINT IMAGE

INPUT IMAGE   REFERENCE IMAGE

CORRELATION IMAGE

CORRELATION PEAK   CORRELATION PEAK

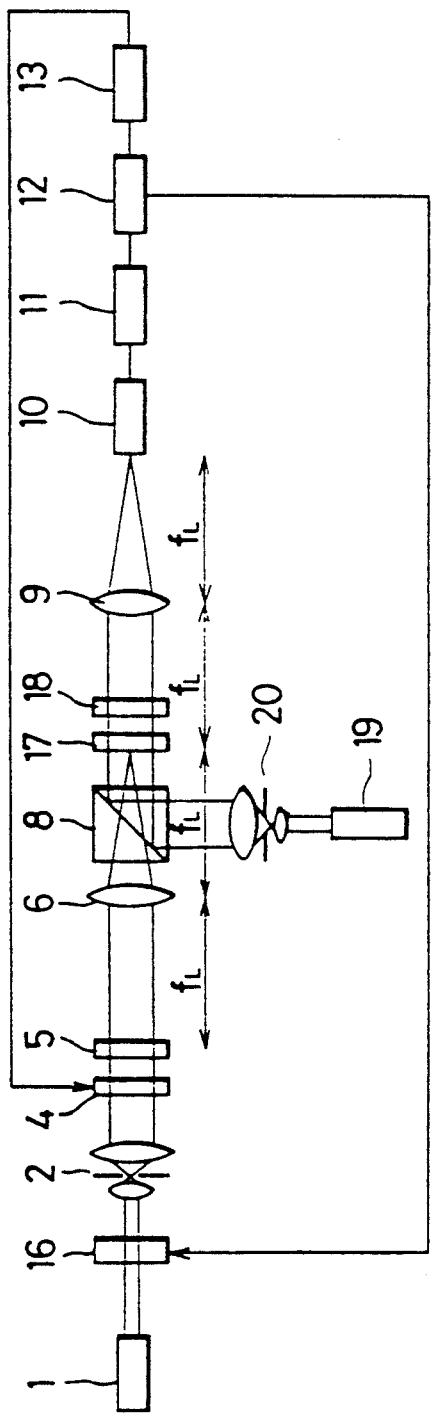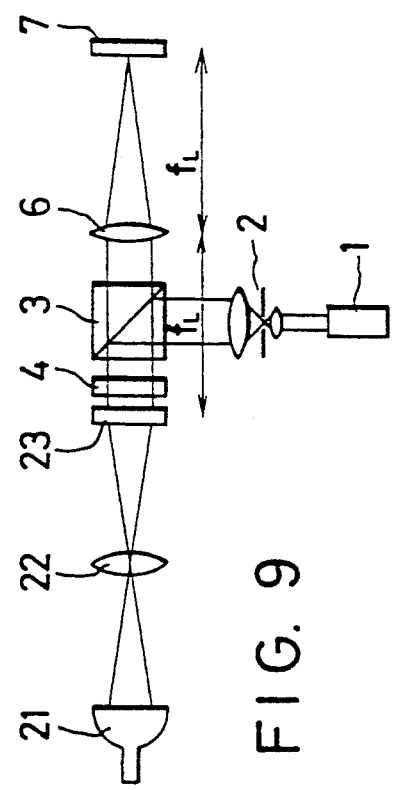

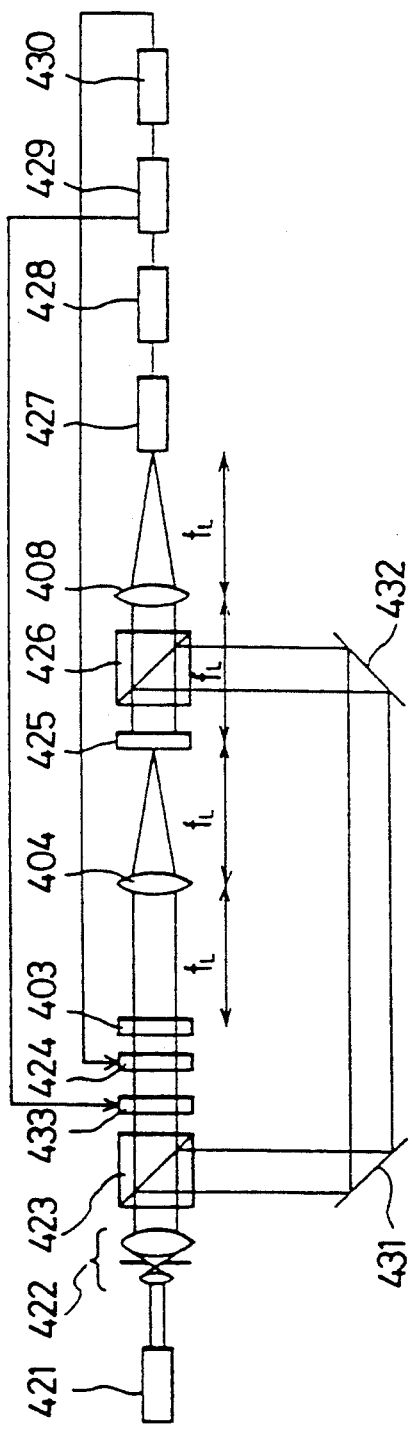

OPTICAL PATTERN RECOGNITION APPARATUS

This is a continuation application of parent application Ser. No. 539,725 filed Jun. 15, 1990.

BACKGROUND OF THE INVENTION

The present invention relates to an apparatus for applying optical correlation processing using coherent light to a two dimensional image obtained from an image sensor such as a CCD camera to effect automatic pattern recognition or measurement in the field of optical information processing and optical measurement.

Conventionally, the optical pattern recognition apparatus and correlation processing apparatus generally employ a joint transform correlator. As shown, for example, in FIG. 2, a spatial light modulator of the light addressed type is utilized in such apparatus, as disclosed in Japanese Patent Application Laid-Open Nos.138616/1982, 210316/1982 and 21716/1983. In the FIG. 2 apparatus, a plate 5 has a joint image composed of a reference image, i.e., recognition basis and an input image, i.e., an object of recognition. A laser 1 emits a laser beam which is expanded by a beam expander 2. Thereafter, the expanded laser beam irradiates the joint image on the plate 5 to convert the joint image into a coherent image. The thus obtained coherent image is Fourier transformed by a Fourier transform lens 6. Light intensity distribution of the Fourier transform image is recorded on a spatial light modulator in the form of a liquid crystal light valve 7 which is disposed on a Fourier plane of the lens 6.

Next, an incident light beam divided by a beam splitter 3 is directed through mirrors 14, 15 and a polarizing beam splitter 8 onto the liquid crystal light valve 7 to read out the recorded light intensity distribution of the Fourier transform image. The thus reproduced Fourier transform image is passed through the polarizing beam splitter 8 and is again Fourier transformed by another Fourier transform lens 9 to produce on its Fourier transform plane a correlation image containing correlation peaks indicative of the correlation coefficient between the input image and the reference image. Such peaks are detected by a CCD camera 10.

FIG. 3 shows an example of a joint image composed of an input image and a reference image adjacent to the input image. FIG. 4 shows an example of a pair of correlation peaks detected by the CCD camera 10 and indicative of a correlation coefficient between the reference image and the input image.

However, the conventional apparatus normally treats a pair of a single input image and a single reference image. Therefore, when recognizing a letter of the alphabet, a particular character to be recognized is represented as an input image. In order to examine the correlation relative to all of the alphabetical characters, a reference image is replaced one by one for each character so as to effect sequential correlation processing, thereby consuming considerable time. In order to solve such a problem, concurrent correlation processing could be undertaken between an input image and a multiple of reference images. However, in such a case, the intensity of each correlation peak is seriously weakened due to interference during concurrent correlation processing between the multiple of the reference images and a single input image, while noise increases to undermine weakened correlation peaks and to hinder separation thereof to thereby cause incorrect recognition.

Further, recently it has been suggested, for example, in B. Javidi and C. J. Kuo, Applied optics, 27,663 (1988) that the intensity distribution of the joint Fourier transform image between reference and input images is binarized to form clear and sharp correlation peaks to improve the S/N ratio. However, this prior art construction is still not effective to carry out the concurrent correlation processing without any incorrect recognition.

SUMMARY OF THE INVENTION

An object of the present invention is to, therefore, provide a joint correlator effective to carry out concurrent correlation processing at a fast speed without incorrect recognition.

According to a first aspect of the invention, in the joint transform correlator utilizing a spatial light modulator of the light addressed type, depending on the light intensity of each correlation peak obtained from optical correlation processing between at least one reference image and at least one input image, the light intensity passing through each reference image corresponding to each correlation peak is substantially adjusted so as to constitute a feedback system. By such construction, when processing a relatively large number of input or reference images, the correlator can avoid failure of recognition due to a reduction of the light intensity of correlation peaks and can avoid erroneous recognition thus enabling fast pattern recognition.

Namely, the inventive optical pattern recognition apparatus applies optical correlation processing using coherent light to a two-dimensional image obtained from a CCD camera or the like so as to automatically recognize and measure a particular pattern. The inventive device comprises means for converting at least one reference image, including a particular object image and at least one input image into a joint coherent image. means for Fourier transforming the joint coherent image to produce a joint Fourier transform image of the reference image and the input image, a spatial light modulator of the light addressed type for recording the joint Fourier transform image, means for reading the image recorded in the spatial light modulator of the light addressed type by using coherent light, means for Fourier transforming the read image into a correlation image, means in the form of a video camera for converting the correlation image into a correlation signal, means for digitally processing the correlation signal to determine a two-dimensional correlation coefficient between the reference image and the input image, and means including another spatial light modulator adjacent to a plane of the reference image for changing the intensity of the coherent light passing through the plane of the reference image according to the determined correlation coefficient to thereby effect correction of the correlation coefficient through feedback.

According to the above described construction, when the light intensity of the respective correlation peak is lowered by increasing a number of reference images in order to effect concurrent correlation processing with respect to the multiple of the reference images, the feedback correction is iterated by masking each reference image according to the light intensity of the corresponding correlation peak so as to produce distinct and clear correlation peaks to thereby effect fast and accurate pattern recognition.

According to a second aspect of the invention, in the joint transform correlator utilizing a spatial light modulator of the electrically addressed type, depending on light intensity of each correlation peak obtained from optical correlation processing between at least one reference image and at least one input image, the light intensity passing through each reference image, corresponding to each correlation peak is substantially adjusted so as to constitute a feedback system. By such construction, when processing a relatively large number of input or reference images, the correlator can avoid failure of recognition due to a reduction of the light intensity of correlation peaks and can avoid erroneous recognition to enable fast pattern recognition.

Namely, the inventive optical pattern recognition apparatus applies optical correlation processing using coherent light to a two-dimensional image obtained from a CCD camera or the like so as to automatically recognize and measure a particular pattern. The inventive device comprises means for converting at least one reference image including a particular object image and at least one input image into a joint coherent image, means for Fourier transforming the joint coherent image to produce a joint Fourier transform image of the reference image and the input image, a spatial light modulator of the electrically addressed type for recording the joint Fourier transform image, means for reading the image recorded in the spatial light modulator of the electrically addressed type by using coherent light, means for Fourier transforming the read image into a correlation image, means in the form of a video camera for converting the correlation image into a correlation signal, means for digitally processing the correlation signal to determine a two-dimensional correlation coefficient between the reference image and the input image, and means including another spatial light modulator adjacent to a plane of the reference image for changing the intensity of the coherent light passing through the plane of the reference image according to the determined correlation coefficient to thereby effect correction of the correlation coefficient through feedback.

According to the above described construction, when the light intensity of the respective correlation peaks is lowered by increasing the number of reference images in order to effect concurrent correlation processing with respect to the multiple of the reference images, the feedback correction is iterated by masking each reference image according to the light intensity of the corresponding correlation peaks so as to produce distinct and clear correlation peaks to thereby effect fast and accurate pattern recognition.

According to a third aspect of the invention, in the binary joint transform correlator utilizing a spatial light modulator, depending on light intensity of each correlation peak obtained from optical correlation processing between at least one reference image and at least one input image, the light intensity passing through each reference image corresponding to each correlation peak is substantially adjusted so as to constitute a feedback system. By such construction, when processing a relatively large number of input or reference images, the correlator can avoid failure of recognition due to a reduction of the light intensity of correlation peaks and can avoid errornous recognition to enable fast pattern recognition.

Namely, the inventive optical pattern recognition apparatus applies optical correlation processing using coherent light to a two-dimensional image obtained from a CCD camera or the like so as to automatically recognize and measure a particular pattern. The inventive device comprises means for converting at least one reference image including a particular object image and at least one input image into a joint coherent image, means for Fourier transforming the joint coherent image to produce a joint Fourier transform image of the reference image and the input image, means for converting the joint Fourier transform image into a corresponding electric signal by an image detector and binarizing the electric signal to input the same into an electrically addressed spatial light modulator to display a binarized intensity distribution image, or means for irradiating the joint Fourier transform image onto an light addressed binary spatial light modulator composed of ferroelectric liquid crystal having a bistable memory characteristic between its reflectivity and applied voltage to binarize the same to record a binarized intensity distribution image, means for reading the binarized intensity distribution image recorded in the spatial light modulator by using coherent light, means for Fourier transforming the read binarized intensity distribution image into a correlation image, means in the form of a video camera for converting the correlation image into a correlation signal, means for digitally processing the correlation signal to determine two-dimensional correlation coefficients between the reference images and the input image, and means including another masking spatial light modulator adjacent to a plane of the reference image for changing an intensity of the coherent light passing through the plane of the reference image according to the determined correlation coefficient to thereby effect correction of the correlation coefficient through feedback.

In the above described construction, the Fourier transform plane opposed to the input plane has the Fourier transform image superposed with an interference pattern caused among the multiple reference images on the input plane. The intensity distribution of the Fourier transform image is binarized to sharpen the superposed interference pattern to thereby form distinct correlation peaks. Further, when the light intensity of the respective correlation peaks is lowered and noise develops by increasing the number of reference images in order to effect concurrent correlation processing with respect to the multiple of the reference images, the feedback correction is iterated by masking each reference image according to the light intensity of the corresponding correlation peak so as to produce distinct and clear correlation peaks to thereby effect fast and accurate pattern recognition and to reduce the noise.

According to a fourth aspect of the invention, in the joint transform correlator utilizing a spatial light modulator of the light addressed type, depending on the light intensity of each correlation peak obtained from optical correlation processing between at least one reference image and at least one input image, the light intensity passing through each reference image corresponding to each correlation peak is substantially adjusted so as to constitute a feedback system. In such construction, the intensity of Fourier transform image or the intensity of the correlation signal is normalized for different reference images. By such operation, when processing a relatively large number of input or reference images, the correlator can avoid failure of recognition due to reduction of the light intensity of correlation peaks and can avoid errornous recognition to enable fast pattern recognition.

Namely, the optical pattern recognition apparatus is comprised of means for converting a joint image composed of at least one reference image including a given object image and at least one input image into a coherent image, means for Fourier transforming the coherent image to produce a joint Fourier image of the reference and input images, and means for converting the joint Fourier image into an intensity distribution image and for displaying the same on a spatial light modulator or recorder or means for converting the joint Fourier image into a binarized intensity distribution image and for displaying the same on a binary spatial light modulator or recorder. The appratus further includes means for reading the intensity distribution image displayed on the recorder by using a coherent light, means for Fourier transforming the read intensity distribution image into a correlation image and for converting the correlation image into a corresponding correlation image signal by using an image detector, and means for digitally processing the correlation image signal to determine a two-dimensional correlation coefficient between an input image and each of the reference images. The apparatus further includes a masking spatial light modulator or light valve of the electrically addressed type disposed before or after the reference image plane and being operable to change its transmittance or reflectivity locally according to each correlation coefficient. The masking light valve is further operable to change its transmittance or reflectivity locally corresponding to each of the reference and input images, i.e., primary images according to area ratio or input intensity ratio of the reference or input images so as to normalize the light intensity of the respective primary images to thereby equalize the joint Fourier transform intensity between an input image and each reference image. By such construction, when using concurrently multiple reference images having different sizes, each correlation peak is not undermined by noise and thereby avoids erroneous recognition.

In such construction, on the plane of the joint Fourier image, coherent light from the reference image and coherent light from the input image interfere with each other to form an interference pattern in superposed relation to the joint Fourier image. By normalizing the intensity of the reference and input images, the visibility of the superposed interference pattern can be improved. Accordingly, a carrier wave component is not deformed when binarizing the intensity distribution of the joint Fourier image. Moreover, the noise component can be reduced to thereby sharpen greatly the correlation peaks. Particularly when there is a considerable area or size difference among the multiple reference images, any affect due to such difference can be removed by normalizing input intensity of the reference images.

Further, when the light intensity of the respective correlation peaks is lowered and noise develops by increasing the number of reference images in order to effect concurrent correlation processing with respect to the multiple of the reference images, the feedback correction is iterated by masking each reference image according to the light intensity of the corresponding correlation peak so as to produce distinct and clear correlation peaks to thereby effect fast and accurate pattern recognition.

According to a fifth aspect of the invention, in the joint transform correlator utilizing a spatial light modulator of the light addressed type, the light intensity of each correlation peak obtained from optical correlation processing between at least one reference image and at least one input image is processed by a nonlinear function unit. According to its output, the light intensity passing through each reference image corresponding to each correlation peak is substantially adjusted so as to constitute a feedback system. By such construction, when processing a relatively large number of input or reference images, the correlator can avoid failure of recognition due to a reduction of the light intensity of correlation peaks and due to noise increase, and can avoid erroneous recognition to enable fast pattern recognition.

Namely, the inventive optical pattern recognition apparatus applies optical correlation processing using coherent light to a two-dimensional image obtained from a CCD camera or the like so as to automatically recognize and measure a particular pattern. The inventive device comprises means for converting at least one reference image including a particular object image and at least one input image into a joint coherent image, means for Fourier transforming the joint coherent image to produce a joint Fourier transform image of the reference image and the input image, a spatial light modulator for recording the joint Fourier transform image in the form of an intensity distribution image, means for reading the intensity distribution image recorded in the spatial light modulator with using coherent light, means for Fourier transforming the read intensity distribution image into a correlation image, means in the form of a video camera for converting the correlation image into a correlation signal, means for digitally processing the correlation signal to determine a two-dimensional correlation coefficient between the reference image and the input image, and means including a masking spatial light modulator adjacent to a plane of the reference image for changing the intensity of the coherent light passing through the plane of the reference image according to the determined correlation coefficient through linear or nonlinear saturation type function unit or a step type function unit of at least one stage or a combination thereof to thereby effect correction of the correlation coefficient through feedback.

In the above described construction, various feedback transfer functions of linear and nonlinear types can be suitably selected to determine the feedback relation from the mutual correlation coefficient to the transmitting light intensity passing through the corresponding reference image, depending on various conditions such as the number of input and reference images, similarity of the reference images and speed or accuracy needed for the recognition performance. Consequently, by selecting an adequate transfer function, fast pattern recognition or measurement can be carried out while maintaining the accuracy of the recognition.

BRIEF DESCRIPTION OF THE DRAWINGS

FIG. 1 is a structural diagram showing a first embodiment of the inventive optical pattern recognition apparatus;

FIG. 2 is a schematic diagram showing the conventional joint transform correlator of the optical writing type;

FIG. 8 is a structural diagram showing a modification of the first embodiment of the inventive optical pattern recognition apparatus;

FIG. 9 is a structural diagram showing the optical system for inputting a joint image into the inventive apparatus;

FIG. 22 is a structural diagram showing a modification of the fifth embodiment of the present invention;

FIG. 23 is a diagram showing one example of the primary image arrangement used in the embodiment;

DETAILED DESCRIPTION OF THE INVENTION

Figure 3:
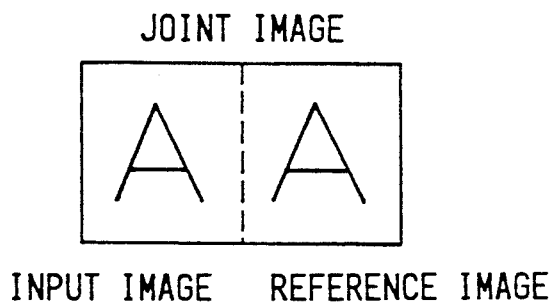
FIG. 3 is an illustration showing an example of an joint image to be processed in the conventional joint transform correlator.
Figure 4:
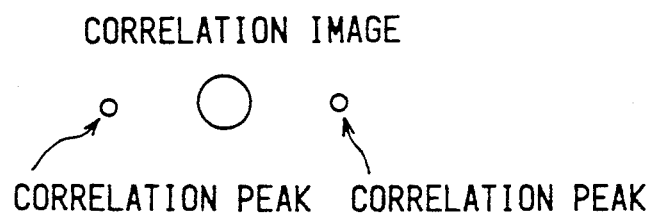
FIG. 4 is an illustration showing an example of the correlation peak image from the conventional joint transform correlator.

Embodiments of the present invention will be described in conjunction with the drawings hereinafter. FIG. 1 is a block diagram showing a first embodiment of the inventive optical pattern recognition apparatus. A laser 1 emits a coherent light which is expanded by a beam expander 2 and is then divided into two light beams by a beam splitter 3. One of the divided light beams passes a masking light valve 4 in the form of a liquid crystal panel modulator through a shutter 16 to irradiate an input plate 5 having a joint image composed of an input image and at least one reference image adjacent in parallel to the input image so as to convert the joint image into a coherent image. A Fourier transform lens 6 Fourier transforms the coherent image into a Fourier transform image which is projected onto a spatial light modulator or recorder 7 in the form of a liquid crystal panel to record thereon a light intensity distribution of the Fourier transform image.

On the other hand, the other of the light beams divided by the beam splitter 3 is sequentially reflected by mirrors 14, 15 and a polarizing beam splitter 8, and thereafter illuminates reversely the liquid crystal light valve 7. Since the light valve 7 is of the reflective type, the other light beam irradiates a rear face of the light valve 7 opposite to a front face thereof which holds the Fourier transform image. By such operation, the Fourier transform image recorded on the liquid crystal panel light valve 7 in the form of its light intensity distribution is read or reproduced as it is. This image is again Fourier transformed through the polarizing beam splitter 8 by another Fourier transform lens 9 into a correlation image. Correlation peaks contained therein is detected by a CCD camera 10.

In such construction, the input plate 5 is disposed a distance fL on an object focal plane of the first Fourier transform lens 6 and the liquid crystal light valve 7 is disposed on a Fourier focal plane of the lens 6. Further, the liquid crystal light valve 7 is aligned on an object focal plane of the second Fourier transform lens 9 and the CCD camera 10 is disposed a distance fL on a Fourier focal plane of the lens 9. In addition, the masking light valve 4 is disposed just before the input plate 5. The shutter 16 is controlled by a computer 12 to close the optical pass during other than recording of the Fourier transformed image onto the light valve 7 in the form of the light intensity distribution.

The CCD camera 10 outputs an analog signal representative of the correlation image, which is converted into a corresponding digital signal by an A/D converter 11. The computer 12 receives the digital signal and processes it to determine correlation coefficient data according to the light intensity of the correlation peaks contained in the correlation image. The computer 12 further outputs according to the data a digital signal effective to operate the light valve 4. Namely, the digital signal is converted into a corresponding analog signal by a D/A converter 13 to drive the light valve 4.

Figure 5:
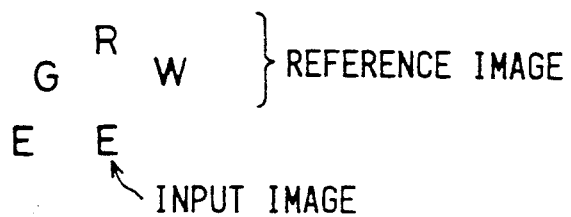
FIG. 5 is an illustration showing an example of the joint image to be processed by the inventive apparatus.

Next, the description is given for the operation of the FIG. 1 embodiment. As shown in FIG. 5, the joint image on the input plate 5 is composed of a central input image and a plurality of peripheral reference images along an arc such that a distance is made equal between the input image and the respective reference images. The masking light valve 4 has homogeneously maximum transparency in the initial state.

In the initial state, the CCD camera 10 detects a plurality of correlation peaks based on correlations between the input image and the respective reference images. For example in case of the FIG. 5 joint image, four pairs of correlation peaks may be detected correspondingly to the four reference images. In such case, the light intensity or level of the respective peaks is smaller than that of a correlation peak between a single reference image and a single input image, while noise increases to make difficult discrimination between peak and noise to cause errornous recognition.

The analog image signal output from the CCD camera 10 is converted into the digital image signal by the A/D converter 11. The computer 12 determines the peak level data of each correlation peak based on analysis of the digital signal. Then, each level data is normalized by the maximum level data among all of the correlation peaks. The light valve 4 is operated to gradatively mask each reference image proportionally to the corresponding normalized level data, i.e., correlation coefficient. For example as in the initial state where the FIG. 5 joint image is processed, the maximum correlation peak is obtained between the input image "E" and the particular reference image "E". Therefore, the other peak levels are normalized by this maximum peak to determine normalized peak level 0.8 for the reference image "G", 0.7 for the reference image "R" and 0.6 for the reference image "W", while value 1 is given for the reference image "E". According to these rates, the masking light valve 4 is operated to proportionally mask the respective reference images. Namely, while the reference image "E" is not masked, the irradiation amounts of light beams are changed or reduced for the reference images "G", "R" and "W" by the rates 0.8, 0.7 and 0.6 respectively by adjusting locally the transmittance of the light valve 4.

Then in the subsequent state after the adjustment or correction, the CCD camera 10 detects update correlation peaks. Consequently to the correction, the correlation peaks are lowered for the reference images "G", "R" and "W" as compared to their initial peak levels because they are masked against the incident coherent light beam. On the other hand, since the reference image "E" is not masked, its peak level is boosted higher than its initial level. Then, the masking operation is again carried out according to the relative ratio of the update correlation peak levels. By iterating this operation, the plurality of correlation peaks are converged into a single pair and the remaining peaks disappear. In the final state, the non-correlative reference images are completely masked to thereby effect recognition of the input image.

Figure 6:
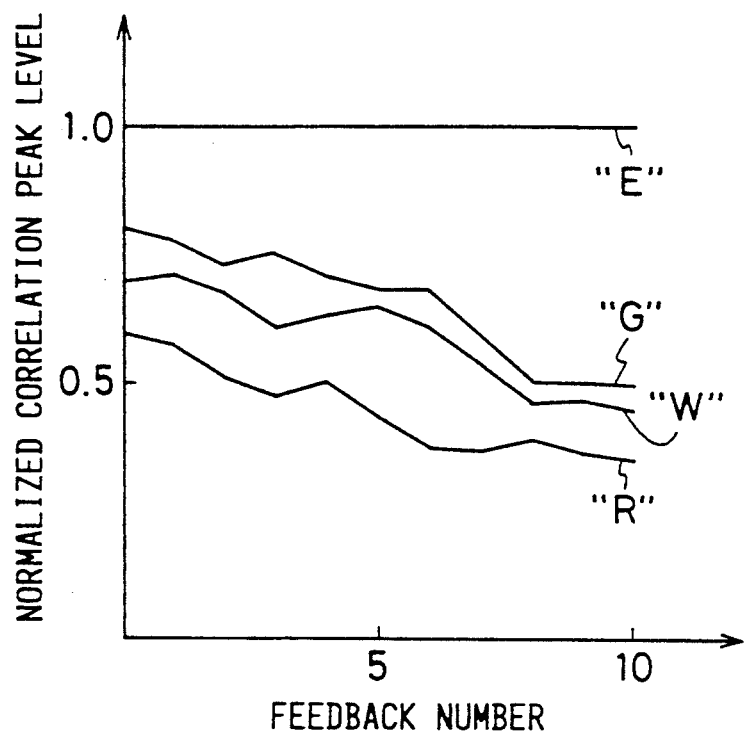
FIG. 6 is a graph showing the change in the normalized peak level of the correlation image when the input image is "E" in terms of the correction feedback number according to the invention.
Figure 7:
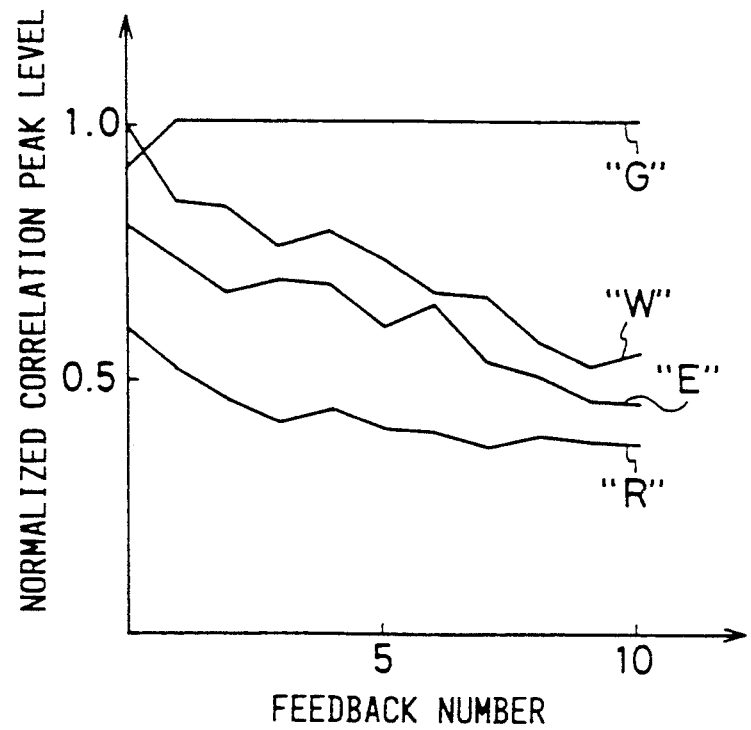
FIG. 7 is a graph showing the change in the normalized peak level of the correlation image when the input image is "G" in terms of the correction feedback number according to the invention.

FIG. 6 shows change of normalized correlation peak levels in terms of masking cycles in this embodiment. The graph shows that the peak levels other than that for the reference image "E" gradually decrease by iterating the masking through feedback. In FIG. 6, since the correlation peak of the reference image "E" has the highest level than the other correlation peaks in the initial state, the input image could be recognized to the character E without carrying out the feedback cycle. However, as shown in FIG. 7, when the input image is "G", the initial recognition is incorrect. By iterating the feedback masking so as to eliminate interference among the reference images, the correct recognition can be obtained.

FIG. 8 shows a modification of the first embodiment of the inventive optical pattern recognition apparatus. In this modification, the Fourier transform image recorder is composed of a transmissive spatial light modulator 17 made of BSO crystal ($Bi_{12}SiO_{20}$) in place of the reflective liquid crystal recorder. For this reason, a laser 1 is comprised of an argon gas laser for emitting a green laser beam which wavelength is 514.5 nm effective to record the Fourier transform image on the BSO crystal plate. A shutter 16 is interposed between the laser 1 and the BSO crystal recorder 17. The shutter 16 is controlled by a computer 12 to pass the laser beam only when writing a Fourier transform image. In order to read out the written image, an He-Ne laser 19 is utilized to emit a read laser beam which wavelength is 632.8 nm to which the BSO crystal is non-sensitive. The read laser beam is expanded by a beam expander 20, then is reflected by a beam splitter 8 to illuminate the BSO crystal plate 17, and thereafter passes through a polarizer 18 to thereby read out the recorded Fourier transform image. Other components operate likewise in the FIG. 1 embodiment.

FIG. 9 shows an optical system which shows another method to form a joint image on an input plane. A CRT 21 displays a joint image, which is focused on an liquid crystal light valve 23 by means of a projection lens 22. A laser beam emitted from a laser 1 is expanded by a beam expander 2 and reflected by a beam splitter 3 to pass reversely through a masking liquid crystal light valve 4 to illuminate the reflective light valve 23. Consequently, the joint image displayed by the CRT21 is read out as a coherent image. The read coherent image is Fourier transformed by a Fourier transform lens 6 through the masking light valve 4 and beam splitter 3. In this case, the coherent light beam passes through the masking light valve 4 twice. Therefore, the masking light valve 4 effects the masking by rate $X^2$ one time where X denotes transmittance of the light valve.

In the embodiments of FIG. 1 and 8, when a normalized peak level is 0.8, the masking rate is correspondingly set to 0.8. On the other hand in the FIG. 9 embodiment, when a normalized peak level is X, the effective masking rate is set to $X^2$. So to operate this system linearly, the masking rate should be $\sqrt{x}$. In the embodiments shown in FIG. 1 and 8, the input plane 5 is disposed just after the masking light valve 4; however, generally this mask can be placed on either side of the input plane. In the above described embodiment, the joint image is composed of a single input image and multiple reference images as shown in FIG. 5; however, the joint image may contain multiple input images and a single reference image, or may contain multiple input images and reference images. The laser source 1 of the FIG. 1, FIG. 8 and FIG. 9 embodiments can be composed of a gas laser or semiconductor laser having good coherency. In the above described embodiments, the liquid crystal television type light valve is utilized as a masking light valve 4 for intensity modulating incident light relative to the reference image. Generally any type of gradative or gray scale spatial light modulator can be used as a mask.

As described above, according to the first aspect of the present invention, the feedback correction is repeatedly carried out several times so as to effect concurrent correlation processing with respect to multiple of increased number of reference images to obtain a sharp correlation peak to thereby achieve accurate pattern recognition in manner similar to correlation processing using a single reference image at one sequence. Therefore, the concurrent correlation processing can be under taken faster and more efficiently than the sequential correlation processing where a single different reference image is used.

Figure 10:
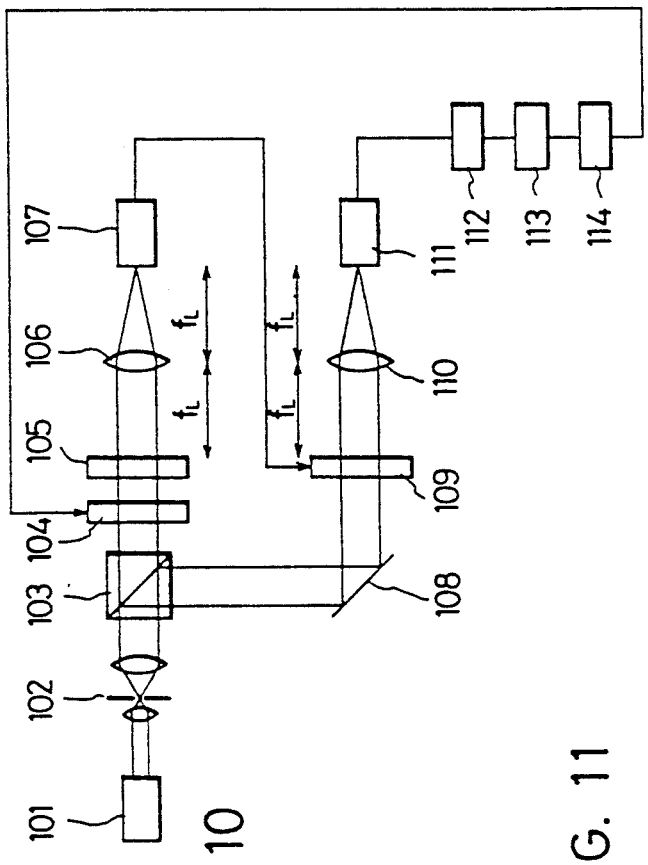
FIG. 10 is a structural diagram showing a second embodiment of the inventive optical pattern recognition apparatus.

FIG. 10 is a structural diagram showing a second embodiment of the inventive optical pattern recognition apparatus. The apparatus includes a laser 101, a beam expander 102 and a beam splitter 103, which constitute means for converting a group of reference images and an input image into a joint coherent image. An input plate 105 having thereon a joint image of the reference and input images, a first Fourier transform lens 106 and a CCD camera 107 constitute means for Fourier transforming the coherent joint image and for converting the resulting image into a corresponding Fourier image signal. A liquid crystal television 109, the laser 101, the beam expander 102, the beam splitter 103 and a mirror 108 constitute means for reading out the Fourier image on the television 109. An second Fourier transform lens 110 and a CCD camera 111 constitute means for again Fourier transforming the read Fourier image into a correlation image and for converting the correlation image into a corresponding correlation image signal. An A/D converter 112, computer 113, D/A converter 114 and masking liquid crystal light valve 104 constitute means for processing the correlation image signal to determine a two-dimensional correlation coefficient between the reference image and the input image and for controlling the light valve 104 according to the correlation coefficient to change transmissivity or reflectivity of a section of the light valve 104 which covers the corresponding reference image.

In such construction, a coherent light emitted from the laser 101 is expanded by the beam expander 102 and then divided into two light beams by the beam splitter 103. One of the divided light beams passes through the masking light valve 104 and then illuminates a joint image of the input image and reference images arranged next to the input image on the input plate 105 so as to convert the joint image into a coherent image. This coherent image is Fourier transformed by the lens 106 to produce the Fourier image, which is detected by the CCD camera 107, and the detected results are recorded or displayed on the liquid crystal television 109 of electrically addressed type.

On the other hand, the other divided light beam from the beam splitter 103 is reflected by the mirror 108 and then illuminate the screen of the liquid crystal television 109. By this, the Fourier image displayed on the television 109 in the form of light intensity distribution is converted into a corresponding coherent image and is then Fourier transformed by the lens 110 to produce a correlation image containing correlation peaks which can be detected by the CCD camera 111. In such construction, the input plate 105 is disposed on the front focal plane of the first Fourier transform lens 106 and the liquid crystal television 109 is disposed on the object plane of the second Fourier transform lens 110. The CCD camera 107 is disposed on the Fourier plane of the lens 106 and the other CCD camera 111 is disposed on the Fourier plane of the lens 110. In addition, the input plate 105 having the joint image is disposed just after the masking liquid crystal light valve 104.

The CCD camera 111 outputs an analog signal representative of the correlation image, which is converted into a corresponding digital signal by an A/D converter 112. The computer 113 receives the digital signal and processes it to determine correlation coefficient data according to light intensity of correlation peaks contained in the correlation image. The computer 113 further outputs according to the data a digital signal effective to operate the light valve 104. Namely, the digital signal is converted into a corresponding analog signal by a D/A converter 114 to drive the light valve 104.

Next, the description is given for the operation of the FIG. 10 embodiment. As shown in FIG. 5, the joint image on the input plate 105 is composed of a central input image and a plurality of peripheral reference images along an arc such that a distance is made equal between the input image and the respective reference images. The masking light valve 104 is set completely transmissive in the initial state.

In the initial state, the CCD camera 111 detects a plurality of correlation peaks based on correlations between the input image and the respective reference images. For example in case of the FIG. 5 joint image, four pairs of correlation peaks may be detected correspondingly to the four reference images. In such case, the light intensity or level of the respective peaks is smaller than that of a correlation peak between a single reference image and a single input image, while noise increases to make difficult discrimination between peak and noise to cause incorrect recognition.

The analog image signal output from the CCD camera 111 is converted into the digital image signal by the A/D converter 112. The computer 113 determines the peak level data of each correlation peak based on analysis of the digital signal. Then, each level data is normalized by the maximum level data among all of the correlation peaks. The light valve 104 is operated to gradatively mask each reference image proportionally to corresponding normalized level data, i.e., correlation coefficient. For example as in the initial state where the FIG. 5 joint image is processed, the maximum correlation peak is obtained between the input image "E" and the particular reference image "E". Therefore, the other peak levels are normalized by this maximum peak to determine normalized peak level 0.8 for the reference image "G", 0.7 for the reference image "R" and 0.6 for the reference image "W", while value 1 is given for the reference image "E". According to these rates, the masking light valve 104 is operated to proportionally mask the respective reference images. Namely, while the reference image "E" is not masked, the irradiation amounts of light beams are changed or reduced for the reference images "G", "R" and "W" by the rates 0.8, 0.7 and 0.6, respectively, by adjusting locally the transmittance of the light valve 104.

Then in the subsequent state after the adjustment or correction, the CCD camera 111 detects update correlation peaks. Consequently to the correction, the correlation peaks are lowered for the reference images "G", "R" and "W" as compared to their initial peak levels because they are masked against the incident coherent light beam. On the other hand, since the reference image "E" is not masked, its peak level is boosted higher than its initial level. Then, the masking operation is again carried out according to the relative ratio of the update correlation peak levels. By iterating this operation, the plurality of correlation peaks are converged into a single pair and the remaining peaks disappear. In the final state, the non-correlative reference images are completely masked to thereby effect recognition of the input image.

FIG. 6 shows the change of normalized correlation peak levels in terms of masking cycles in this embodiment. The graph shows that the peak levels other than that for the reference image "E" gradually decrease by iterating the masking through feedback. In FIG. 6, since the correlation peak of the reference image "E" has the highest level than the other correlation peaks in the initial state, the input image could be recognized to the character E without carrying out the feedback cycle. However, as shown in FIG. 7, when the input image is "G", the initial recognition is incorrect. By iterating the feedback masking so as to eliminate interference among the reference images, the correct recognition can be obtained.

The input plane 105 is disposed just after the masking light valve 104; however, generally this light valve can be placed on either side of the input plane.

The laser 101 can be composed of a gas laser, a solid laser or semiconductor laser having good coherency.

In the above described second embodiment, the joint image is composed of a single input image and multiple reference images as shown in FIG. 5; however, the joint image may contain multiple input images and a single reference image, or may contain a multiple of input images and reference images.

Figure 11:
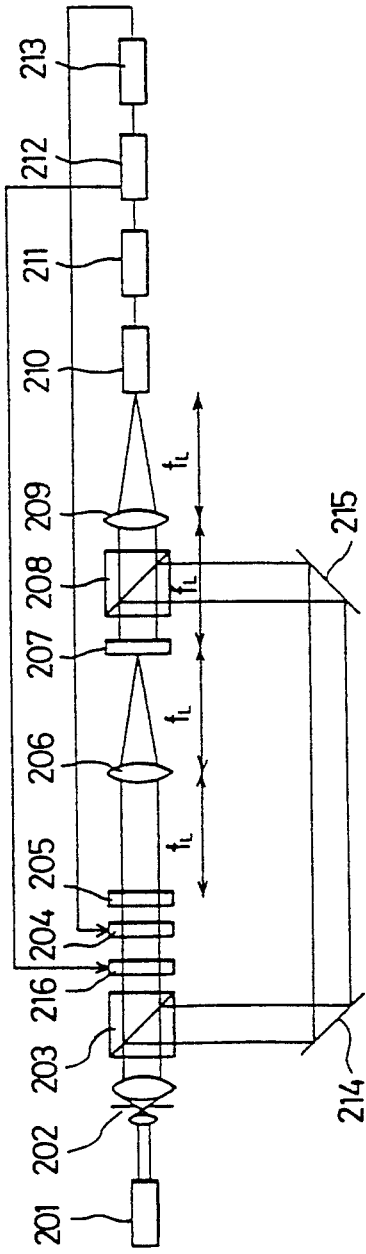
FIG. 11 is a structural diagram showing a third embodiment of the inventive optical pattern recognition apparatus.

FIG. 11 is a structural diagram showing a third embodiment of the present invention. A laser source 102, beam expander 202, shutter 216 and an input plate 205 having thereon a joint image constitute means for converting the joint image composed of at least one reference image including an object reference image and at least one input image into a coherent image. A Fourier transform lens 206 constitutes means for Fourier transforming the coherent image to a joint Fourier image of the reference image and the input image. A binary liquid crystal modulator 207 constitutes means for converting the joint Fourier image into a binarized intensity distribution image and for recording the same. A beam splitter 203, Mirrors 214, 215 and a polarizing beam splitter 208 constitute means for reading the binarized intensity distribution image recorded on the binary liquid crystal modulator 207 with using a coherent light. A Fourier transform lens 209 and a CCD camera 210 coustitute means for Fourier transforming the read coherent image of binarized intensity distribution into a correlation image and for converting the same into a corresponding correlation image signal. An A/D converter 211 and computer 212 constitute means for digitally processing the correlation image signal to determine a two-dimensional correlation coefficient between the reference image and the input image. The computer 212, a D/A converter 213 and a masking liquid crystal light valve 204 disposed adjacent to the reference image plane constitute means for changing transmissivity (or reflectivity) of a section of the masking light valve 204 which covers the reference image according to the correlation coefficient.

In such construction, the coherent light emitted from the laser 201 is expanded by the beam expander 202 and then divided into two light beams by beam spitter 203.

One of the divided light beams passes through the beam splitter 203, the shutter 216 and the masking light valve 204 and then illuminates a joint image of the input image and reference images arranged next to the input image on the input plate 205 so as to convert the joint image into a coherent image. This coherent image is Fourier transformed by the lens 206 to produce the Fourier image on the binary liquid crystal light valve 207. Since the binary liquid crystal light valve 207 is comprised of a ferroelectric liquid crystal having bistable memory characteristic between its optical reflectivity and an applied voltage, the Fourier image is perfectly binarized by a given threshold value. Therefore, the Fourier image is recorded on the binary liquid crystal light valve 207 in the form of a binarized intensity distribution image.

On the other hand, the other divided light beam from the beam splitter 203 is reflected by the mirror 214, mirror 215 and polarizing beam splitter 208 and then is reflected by the binary liquid crystal light valve 207. Since the binary liquid crystal light valve 207 is of the reflection type, the other divided beam illuminates the binary liquid crystal light valve 207 from a direction opposite to the illuminating direction of the Fourier image. By this, the Fourier image displayed on the light valve 207 in the form of binarized light intensity distribution is converted into a corresponding coherent image and is then Fourier transformed by the lens 209 after being read out by the polarizing beam splitter 208 in place of a polarizer in the form of positive or negative intensity distribution to produce a correlation image containing correlation peaks which can be detected by the CCD camera 210. In such construction, the input plate 205 is disposed on the front focal plane of the first Fourier transform lens 206 and the binary liquid crystal light valve 207 is disposed on the Fourier plane of the first Fourier transform lens 206.

Further, the binary liquid crystal light valve or recorder 207 is disposed on the front focal plane of the Fourier transform lens 209, and the CCD camera 210 is disposed on the Fourier plane thereof. The masking liquid crystal light valve 204 is disposed just before or after the input plate 205. The shutter 216 is controlled by the computer 212 to open only when recording the Fourier image in the form of light intensity distribution on the binary liquid crystal recorder 207 and to close other times.

The CCD camera 210 outputs an analog signal representative of the correlation image, which is converted into a corresponding digital signal by an A/D converter 211. The computer 212 receives the digital signal and processes it to determine correlation coefficient data according to light intensity of correlation peaks contained in the correlation image. The computer 212 further outputs according to the data a digital signal effective to operate the masking light valve 204. Namely, the digital signal is converted into a corresponding analog signal by a D/A converter 213 to drive the masking light valve 204.

As shown in FIG. 5, the joint image on the input plate 205 is composed of a central input image and a plurality of peripheral reference images along an arc such that a distance is made equal between the input image and the respective reference images. The masking light valve 204 has homogeneously maximum transparency in the initial state.

In the initial state, the CCD camera 210 detects a plurality of correlation peaks based on correlations between the input image and the respective reference images. For example in case of the FIG. 5 joint image, four pairs of correlation peaks may be detected correspondingly to the four reference images. In such case, the light intensity or level of the respective peaks is smaller than that of a correlation peak between a single reference image and a single input image, while noise increases to make it difficult to discriminate between peak and noise to cause incorrect recognition.

The analog image signal outputted from the CCD camera 210 is converded into the digital image signal by the A/D converter 211. The computer 212 determines the peak level data of each correlation peak based on analysis of the digital signal. Then, each level data is normalized by the maximum level data among all of the correlation peaks. The light valve 204 is operated to gradatively mask each reference image proportionally to corresponding normalized level data, i.e., correlation coefficient. For example as in the initial state where the FIG. 5 joint image is processed, the maximum correlation peak is obtained between the input image "E" and the particular reference image "E". Therefore, the other peak levels are normalized by this maximum peak level to determine normalized peak level 0.8 for the reference image "G", 0.7 for the reference image "R" and 0.6 for the reference image "W", while value 1 is given for the reference image "E". According to these rates, the masking light valve 204 is operated to proportionally mask the respective reference images. Namely, while the reference image "E" is not masked, the irradiation amounts of light beams are changed or reduced for the reference images "G", "R", and "W" by the rates 0.8, 0.7 and 0.6, respectively, by adjusting locally the transmittance of the light valve 4.

Then in the subsequent state after the adjustment or correction, the CCD camera 210 detects updated correlation peaks. Consequently to the correction, the cross-correlation peaks for the reference images "G", "R" and "W" are lowered as compared to their initial peak levels because they are masked against the incident coherent light beam. On the other hand, since the reference image "E" is not masked, its peak level is boosted higher than its initial level. Then, the masking operation is again carried out according to the relative ratio of the update correlation peak levels. By iterating this operation, the plurality of correlation peaks are converged into a single pair and the remaining peaks disappear. In the final state, the non-correlative reference images are completely masked to thereby effect recognition of the input image.

Figure 12:
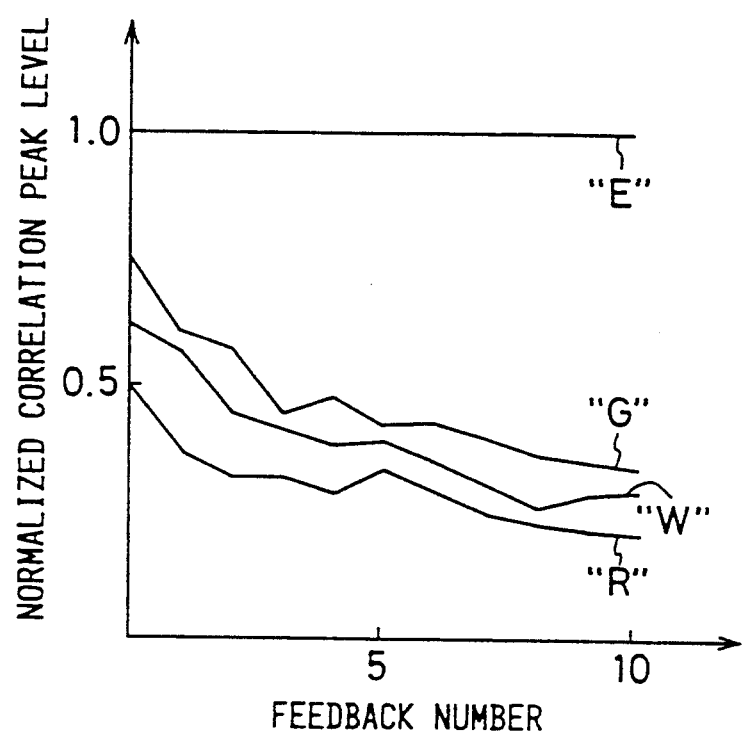
FIG. 12 is a graph showing the change in the normalized peak level of the correlation image when the input image is "E" in terms of the correction feedback number according to the third embodiment.
Figure 13:
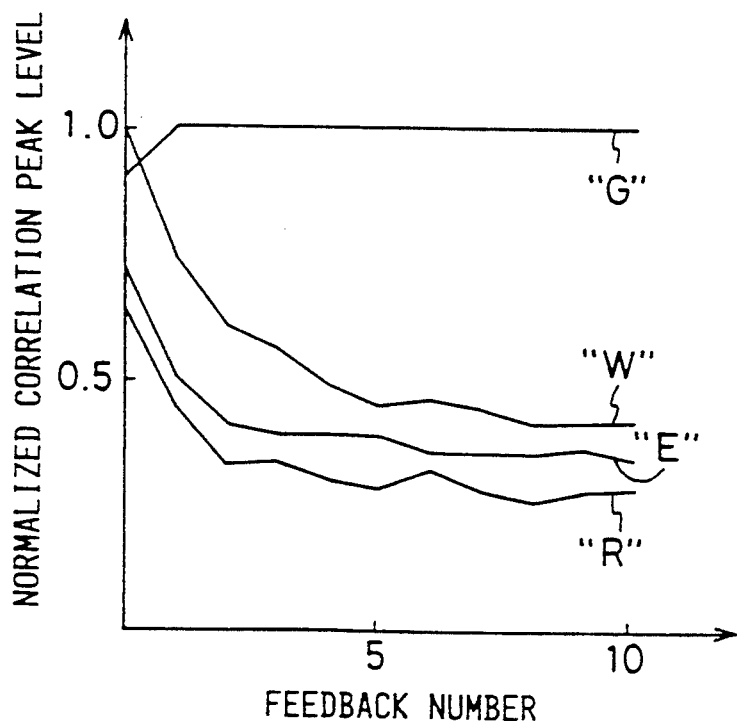
FIG. 13 is a graph showing the change in the normalized peak level of the correlation image when the input image is "G" in terms of the correction feedback number according to the third embodiment.

FIG. 12 shows the change of normalized correlation peak levels in terms of masking cycles in this third embodiment. The graph shows that the peak levels other than that for the reference image "E" gradually decrease by iterating the masking through feedback. In FIG. 12, since the correlation peak of the reference image "E" has the highest level than the other correlation peaks in the initial state, the input image could be recognized to the character E without carrying out the feedback cycle. However, as shown in FIG. 13, when the input image is "G", the initial recognition is incorrect. By iterating the feedback masking so as to eliminate interference among the reference images, the correct recognition can be obtained.

In the above described third embodiment, the maximum light intensity of each correlation peak is utilized for normalization of each correlation peak; however, total light amount or average light amount of each correlation peak can be used for the normalization basis.

Figure 15:
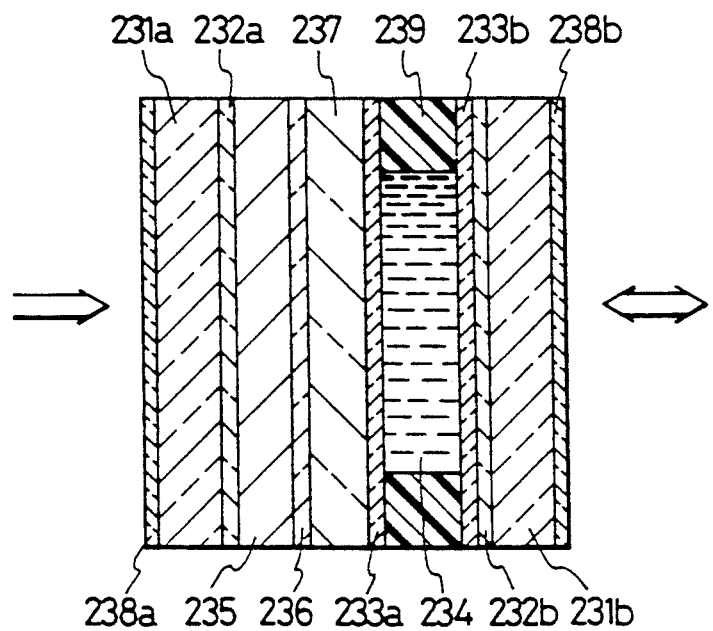
FIG. 15 is a sectional view showing a structure of the liquid crystal light valve utilizing ferroelectric liquid crystal.

FIG. 15 is a sectional view showing the structure of the binary liquid crystal light valve 207 using ferroelectric liquid crystal. The binary light valve has a pair of transparent substrates 231a and 231b made of glass or plastic for sandwiching liquid crystal, the substrates 231a and 231b having transparent electrodes 232a and 232b, respectively, on their inner faces and alignment layers 233a and 233b, respectively, formed of oblique evaporation of silicon monoxide at an incident angle in the range from 75° to 85° with respect to the normal of the transparent substrates. The transparent substrates 231a and 231b are opposed to each other a given distance through a spacer 239 to sandwich therebetween a ferroelectric liquid crystal layer 234 in contact with the alignment layers 233a and 233b. Further, a photoconductive layer 235 is superposed sequentially with a light shielding layer 236 and a dielectric mirror 237 between the transparent electrode 232a and the alignment layer 233a to effect optical writing. The writing side transparent substrate 231a and the reading side transparent substrate 231b are formed with anti-reflection coatings 238a and 238b, respectively, on their outer faces of the cell.

Next, the description is given for initializing the binary liquid crystal light valve 207 having the above described structure. According to a first method, while the entire surface of the binary liquid crystal light valve 207 is illuminated from the writing side, the pair of transparent electrode layers 232a and 232b are applied therebetween with a DC bias voltage, or a DC bias voltage superposed with AC voltage of 100 Hz-50 KHz, sufficiently greater then the maximum value of a first threshold voltage determined when the photoconductive layer 235 is irradiated or in bright condition. By such operation, molecules of the ferroelectric liquid crystal are aligned in a stable state to memorize the stable state. According to an alternative second method, without irradiation, the pair of transparent electrode layers 232a and 232b are applied therebetween with a DC bias voltage, or a DC bias voltage superposed with AC voltage of 100 Hz-50 KHz, sufficiently greater than maximum value of a second threshold voltage determined when the photoconductive layer 235 is not irradiated or in dark condition. By such operation, the ferroelectric liquid crystal molecules are aligned in one of the bistable states to memorize the same to thereby initialize or reset the binary light valve 207.

Next, the description is given for the writing and reading method of the binary liquid crystal light valve 207 after the initialization. While applying between the pair of transparent electrode layers 232a and 232b a DC voltage having opposite polarity to the initialization DC voltage and a given voltage level lower than a minimum value of the threshold voltage determined when the photoconductive layer is not irradiated or in the dark condition and higher than a maximum value of the other threshold voltage determined when the phtoconductive layer is irradiated or in the bright condition, an image is optically writen by means of a laser beam on the binary light valve 207. Such DC voltage may be superposed with an AC voltage of 100 Hz-50 KHz. Carriers are generated in a region of the photoconductive layer irradiated by the incident laser beam, and the generated carriers drift in the direction of the electric field due to the DC bias voltage to lower the threshold voltage in the photoconductive layer. Consequently, the corresponding region of the liquid crystal layer irradiated by the laser beam receives the DC bias voltage of opposite polarity higher than the lower threshold voltage such that the ferroelectric liquid crystal molecules are rotatively reversed due to inversion of the spontaneous dipole thereof to switch to the other of the bistable states to thereby binarize the inputted image and to record the same.

The binarized and recorded image can be read in the positive or negative state by irradiating a linearly polarized read light having a polarization axis aligned in parallel (or normal) to the initial alignment direction of the liquid crystal molecules through a polarizer having a polarization axis normal (or parallel) to that of the reflected reading light from the dielectric mirror 237. In the FIG. 11 embodiment, the polarization beam splitter 208 is utilized in place of the polarizer.

The threshold value for binarization of the image can be set by changing the frequency of the AC voltage applied between the pair of transparent electrode layers 232a and 232b or by changing the level of the DC bias voltage. Otherwise, the power of the incident laser beam can be adjusted to vary light intensity of the Fourier image to be recorded so as to equivalently change the threshold value.

In the above described embodiment of the binary light valve, if the dielectric mirror 237 has a sufficient reflectivity of visible light to substantially block the reading light against the photoconductive layer 235, the light shielding layer 236 can be eliminated. Further, if the photoconductive layer 235 has a sufficient reflectivity to the reading light and the reading light has a small enough light intensity of avoid influence to the photoconductive layer 235, the dielectric mirror 237 can be also removed.

Figure 14:
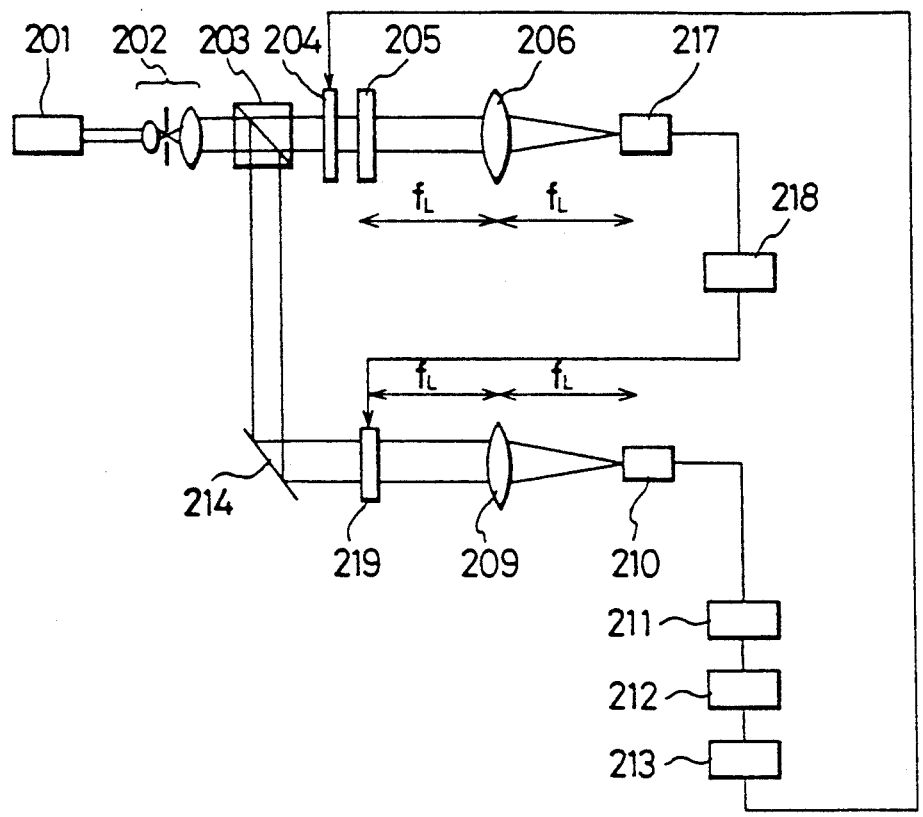
FIG. 14 is a structural diagram showing a modification of the third embodiment of the inventive optical pattern recognition apparatus.

FIG. 14 is a structural diagram showing a modification of the third embodiment of the invention. A CCD camera 217, a binarizing circuit 218 and a liquid crystal television 219 constitute means for converting the joint Fourier image into a binarized intensity distribution and recording the same. This modification has similar construction as in the third embodiment with regard to the arrangement for Fourier transforming the joint image on the input plane 205 by the Fourier transform lens 206. The joint Fourier image is converted into a corresponding Fourier image signal by means of the CCD camera 217. In this state, since the intensity of the Fourier image can be detected by the camera 217, the Fourier image signal is binarized in terms of the intensity level by means of the binarizing circuit 218 with a predetermined threshold value, and the binarized signal is fed to the liquid crystal television 219 of the electrically addressed type to display a binarized Fourier image.

The light beam divided out by the beam splitter 203 is reflected by the mirror 214 to illuminate the liquid crystal television 219 of the transmission type. By this, the binarized intensity distribution of the Fourier image is converted into a corresponding coherent image. This coherent binarized Fourier image is again Fourier transformed by the Fourier transform lens 209, and the resulting image is detected by the CCD camera 210 to produce a correlation image signal. Subsequent processing can be carried out similarly in the third embodiment.

In the above described embodiments, the binarized Fourier image is displayed on the liquid crystal television 219; however, such image can be recorded on a spatial light modulator of the light addressed type by using a scanning optical system such as a laser scanner.

In the above described embodiment, the beam splitter 203 is utilized to divide the light beam from the laser source 201. Instead, a pair of laser sources can be employed.

Figure 16:
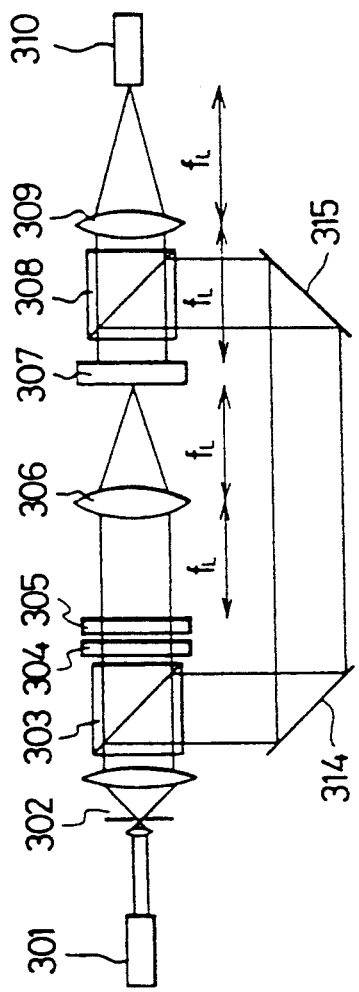
FIG. 16 is a structural diagram showing a fourth embodiment of the inventive optical pattern recognition apparatus.

FIG. 16 is a structural diagram of a fourth embodiment of the invention. A laser 301, beam expander 302, beam splitter 303 and an input plate 305 constitute means for converting a joint image composed of at least one reference image including a given object image and at least one input image on the input plate 305 into a coherent image. A Fourier transform lens 306 and a liquid crystal light valve 307 constitute means for Fourier transforming the coherent image into a joint Fourier image of the reference and input images and for converting the joint Fourier image into an intensity distribution image thereof and displaying the same on the light valve 307. The light valve 307 may be composed of a binary spatial light modulator having light modulatory material made of ferroelectric liquid crystal so as to binarize the joint Fourier image of the reference and input images to display the binarized intensity distribution image. A beam splitter 303, Mirrors 314, 315 and polarizing beam splitter 308 constitute means for reading the non-binarized or binalized intensity distribution image from the spatial light modulator 307 with using a coherent light. A Fourier transform lens 309 and CCD camera constitute means for Fourier transforming the read non-binarized or binarized coherent intensity distribution image into a correlation image and for converting the correlation image into a corresponding electric signal.

In such construction, a coherent light emitted from the laser 301 is expanded by the beam expander 302 and then divided into two light beams by a beam splitter 303. One of the divided light beams passes through the beam splitter 303 and the masking light valve 304 and then illuminates a joint image of the input image and reference images arranged next to the input image on the input plate 305 so as to convert the joint image into a coherent image. This coherent image is Fourier transformed by the lens 306 to produce the Fourier image, which is formed on the liquid crystal light valve 307. By this, the intensity distribution image of the Fourier image is recorded on the light valve 307. At this stage, when using a reflective light valve utilizing ferroelectric liquid crystal having bistable memory characteristic between its reflectivity and applied voltage, the image can be perfectly binarized by a given threshold value. By this, the binarized intensity distribution of Fourier image can be recorded on the light valve 307.

On the other hand, the other divided light beam reflected from the beam splitter 303 is reflected by the mirrors 314, 315 and the polarizing beam splitter 308 and then is reflected by the light valve 307. Since the light valve 307 is of the reflective type, the other beam illuminates the light valve 307 on the opposite side to the recording side of the joint Fourier image. By this, the joint Fourier image displayed on the light valve 307 in the form of optionally binarized light intensity distribution is converted into a corresponding coherent image and is then Fourier transformed by the Fourier transform lens 309, after being read out from the light valve 307 through the polarization beam splitter 308 functioning as a polarizer in the positive or negative image form, to produce a correlation image containing correlation peaks which can be detected by the CCD camera 310. In such construction, the input plate 305 is disposed on the front focal plane of the first Fourier transform lens 306 and the liquid crystal light valve 307 is disposed on the Fourier plane of the first Fourier transform lens 306.

Further, the liquid crystal light valve 307 is disposed on the front focal plane of the Fourier transform lens 309, and the CCD camera 310 is disposed on the Fourier plane thereof. The masking liquid crystal light valve 304 is disposed just before or after the input plate 305.

As shown in FIG. 5, the joint image on the input plate 305 is composed of a central input image and a plurality of peripheral reference images along an arc such that a distance is made equal between the input image and the respective reference images.

In such a case, since the respective reference image has a different segment area, the respective light beam passing through each reference image has a different power. Therefore, if not normalized, there would be caused a intensity difference among the respective Fourier transform image of the reference images formed on a writing surface of the liquid crystal light valve 307, resulting in degradation of the visibility of the interference pattern of the Fourier transform images. In order to prevent such a drawback, incident light beams are normalized and regulated by the masking light valve 304, such that power of each incident light beam irradiated onto each reference image (and/or input image) or each transmitting light beam from each reference image (and/or input image) to the Fourier transform lens 306 is regulated proportionally to s/sj where s indicates a minimum segment area value of the multipe reference images and sj indicates a segment area value of each reference image (j denotes integer). Otherwise, when the input plate 305 is comprised of a photographic film or a liquid crystal television having unevenness of transmissivity, transmitting power of each light beam through the reference and input images is measured to effect the normalization. Namely, each incident light beam power to the respective reference images (and/or input image) or each transmitting light beam power from the respective reference images (and/or input image) to the Fourier transform lens is regulated proportionally to t/Tj where t denotes the minimum value of the measured transmitting light powers and Tj denotes a measured transmitting light power of each of the reference and input images (j denotes integer). The masking light valve 304 may be composed of a light absorbing film of metal or organic polymer formed on a transparent substrate such as glass, or may be composed of a masking spatial light valve of the type electrically addressed such as liquid crystal television. Normally, input or reference image is sequentially updated; hence the electrically addressed light valve is preferrable for randomly regulating the optical transmissivity.

In the initial state, the CCD camera 310 detects a plurality of correlation peaks based on correlations between the input image and the respective reference images. For example in case of the FIG. 5 joint image, four pairs of correlation peaks may be detected correspondingly to the four reference images. In such case, the light intensity or level of the respective peaks is smaller than that of a correlation peak between a single reference image and a single input image, while noise increases to make it difficult to discriminate between peak and noise to cause incorrect recognition.

Figure 18:
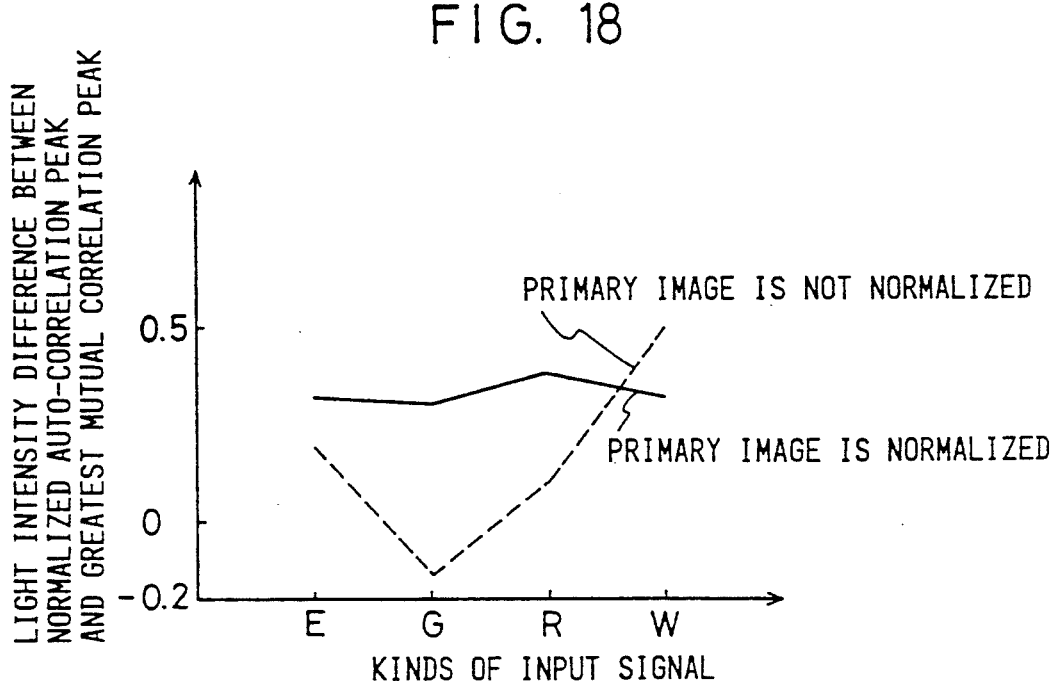
FIG. 18 is the graph showing a light intensity difference between the normalized auto-correlation peak for each reference image and the maximum cross-correlation peak in the case that the reference image is normalized according to the invention and in case that the reference image is not normalized.

Particularly, if the normalization of the primary images were not effected, the greater the segment area value of the primary image, the stronger the corresponding correlation peak. The smaller the segment area value of the primary image becomes, the weaker the corresponding correlation peak becomes. Therefore, incorrect recognition would be caused for the relatively small size primary images. FIG. 18 illustrates such phenomenon. In case of using primary images shown in FIG. 5 containing four reference images and one input image, FIG. 18 shows a light intensity difference between each normalized auto-correlation peak of each reference image and the corresponding input image, and the normalized maximum cross-correlation peak. In this case, the normalized auto-correlation peak and normalized cross-correlation peak is determined such that a maximum light intensity is measured for each correlation peak to define the light intensity of each correlation peak, which is then normalized by the greatest light intensity among all of the correlation peaks. The greater the light intensity difference between the normalized auto-correlation peak and the greatest cross-correlation peak becomes, the more accurate the pattern recognition is achieved. If the difference is negative, erroneous recognition may be caused. Namely, the difference indicates the degree of recognition accuracy. As seen from FIG. 18, even when the primary image is not normalized, clear recognition can be enabled for the input signal "W" which has a relatively large segment area, while erroneous recognition is caused for the input signal "G" which has a relatively small segment area. Degree of recognition is greatly fluctuated for the respective input image. On the other hand, when the primary image is normalized, the degree of recognition is uniform for the respective input images without regard to segment area size of the respective input images. Further, accuracy of recognition can be improved for the respective input images.

Figure 19:
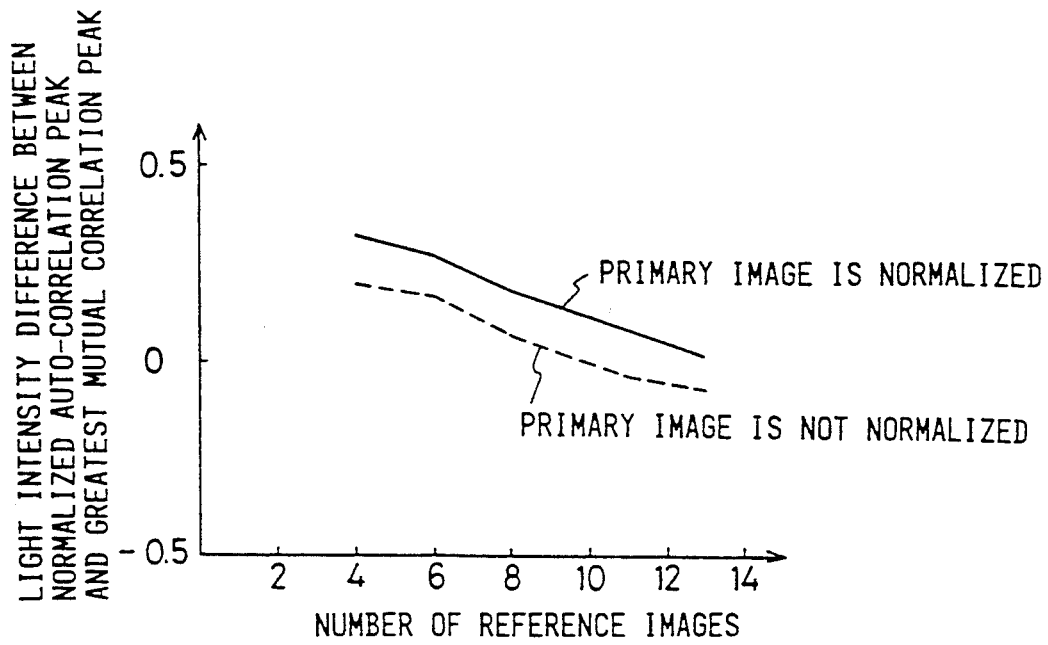
FIG. 19 is the graph showing a light intensity difference between the normalized auto-correlation peak and the maximum cross-correlation peak in terms of the number of reference images in the case that the reference image is normalized and not normalized.

Next, FIG. 19 shows the change in the light intensity difference between the normalized auto-correlation peak and greatest cross-correlation peak when using an input image "E" and when increasing a number of reference images. When not normalizing the input image, the correct recognition can be effected only for 8 to 10 number of reference images. On the other hand, when normalizing the input character image, the correct recognition of character is enabled for 11 to 13 number of reference character images.

Figure 17:
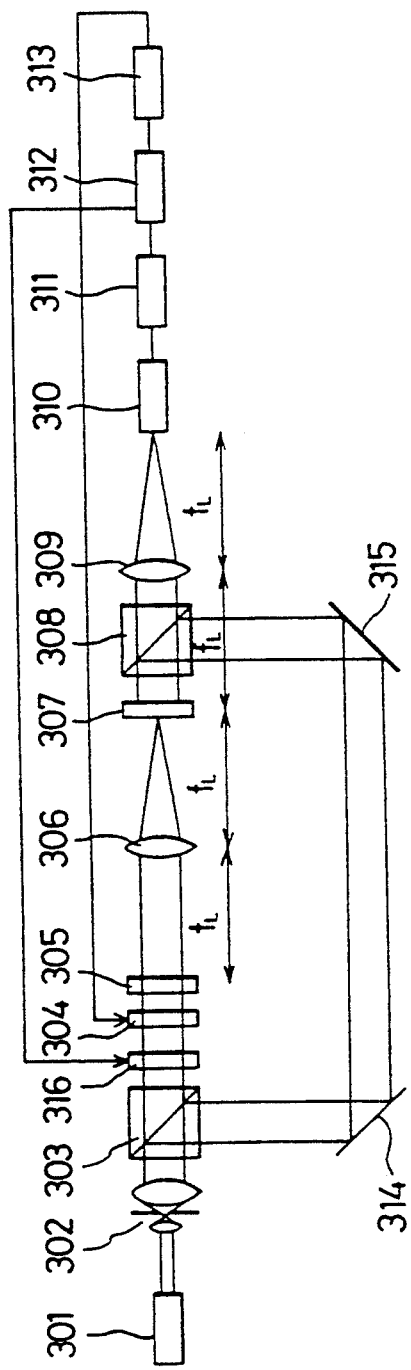
FIG. 17 is a schematic diagram showing a modification thereof.

Next, FIG. 17 shows a modification of the fourth embodiment which utilizes a correlation optical system of the feedback type effective to feedback a correlation output to an input intensity of the joint image. The FIG. 17 embodiment differs from the FIG. 16 embodiment of the optical pattern recognition apparatus in the following aspects. The masking liquid crystal light valve 304 is disposed just before or after the input plate 305. The shutter 316 is controlled by the computer 312 to open only when recording the Fourier image in the form of a light intensity distribution on the liquid crystal light valve 307 and to close at other times.

The CCD camera 310 outputs an analog signal representative of the correlation image, which is converted into a corresponding digital signal by an A/D converter 311. The computer 312 receives the digital signal and processes it to determine correlation coefficient data according to the light intensity of the correlation peaks contained in the correlation image. The computer 312 further outputs according to the data a digital signal effective to operate the masking light valve 304. Namely, the digital signal is converted into a corresponding analog signal by a D/A converter 313 to drive the light valve 304.

This embodiment also processes a joint image, for example, as shown in FIG. 5. In the initial state the masking light valve 304 is held in a completely transmissive state, and the CCD camera 310 detects a plurality of correlation peaks based on correlations between the input image and the respective reference images. In such a case, the light intensity or level of the respective peaks is smaller than that of a correlation peak between a single reference image and a single input image, while noise increases to make it difficult to discriminate between the correlation peaks and noise to cause incorrect recognition.

The analog image signal output from the CCD camera 310 is converted into the digital image signal by the A/D converter 311. The computer 312 determines the peak level data of each correlation peak based on analysis of the digital signal. Then, each level data is normalized by the maximum level data among all of the correlation peaks. The masking light valve 304 is operated to gradatively mask each reference image proportionally to the corresponding normalized level data, i.e., correlation coefficient and inverse-proportionally to the segment ratio of the respective image. For example, in the initial state where the FIG. 5 joint image is processed, the maximum correlation peak is obtained between the input image "E" and the particular reference image "E". Therefore, the other peak levels are normalized by this maximum peak to determine normalized peak level 0.8 for the reference image "G", 0.7 for the reference image "R" and 0.6 for the reference image "W", while value 1.0 is given for the reference image "E". Further, the segment ratio of the respective reference images are 0.8 for the reference image "E", 0.7 for the reference image "G", 0.8 for the reference image "R", and 1.0 for the reference image "W". According to these rates, the masking light valve 304 is operated to proportionally mask the respective reference images. Namely, the irradiation amounts of light beams are changed or reduced for the reference images "E", "G", "R" and "W" by the rates $1 \times 0.8/0.8:0.8 \times 0.8/0.7:0.7 \times 0.8/0.8:0.6 \times 0.8/1 = 1:0.9:0.7:0.5$, respectively, by adjusting locally the transmittance of the light valve 304.

Then in the subsequent state after the adjustment or correction, the CCD camera 310 detects updated correlation peaks. Cousequently to the correction, the correlation peaks are lowered for the reference images "G", "R" and "W" as compared to their initial peak levels because they are masked against the incident coherent light beam. On the other hand, since the reference image "E" is not masked, its peak level is boosted higher than its initial level. Then, the masking operation is again carried out according to the relative ratio of the update correlation peak levels. By iterating this operation, the plurality of correlation peaks are converged into a single pair and the remaining peaks disappear. In the final state, the non-correlative reference images are completely masked to thereby effect recognition of the input image.

Figure 20:
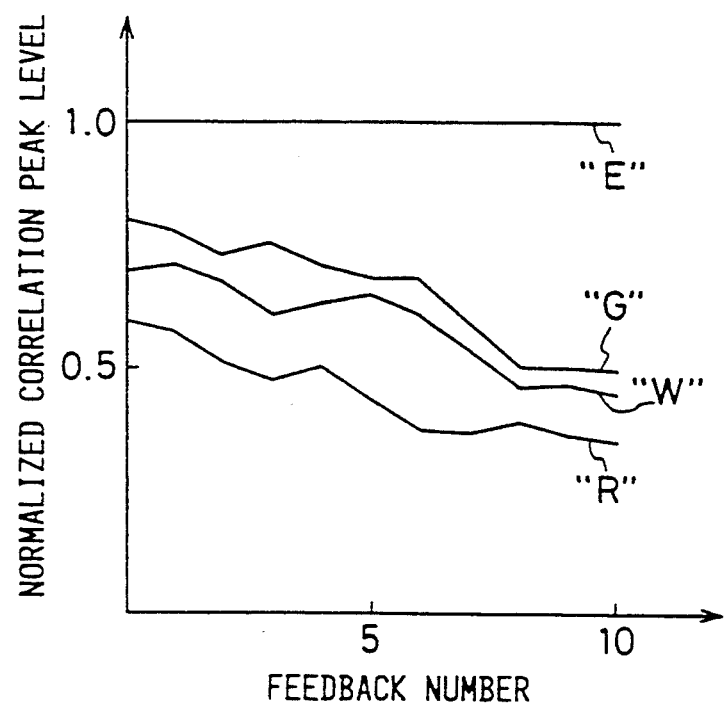
FIGS. 20(a)-(b) are graphs showing the change in the normalized peak level of the correlation image when the input image is "E" in terms of the correction cycle number in the case that the reference images are normalized according to the invention and in case that the reference images are not normalized.
Figure 20:
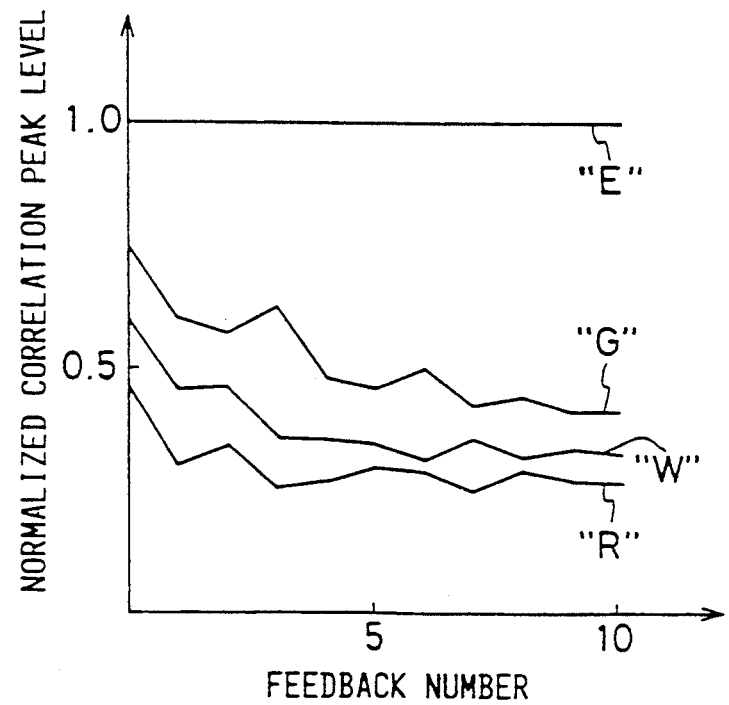

In this embodiment, FIG. 20(a) and FIG. 20(b) show the change in light intensity of normalized correlation peak due to iteration of the feedback operation in the case where the primary image is normalized or not normalized. In either case, the light intensity of the correlation peaks except for the reference image "E" is lowered by iterating the feedback operation. In this case, the correlation peak for the reference image "E" is stronger than any of other correlation peaks in the initial state. Therefore, the correct recognition of the input image "E" can be undertaken without the feedback operation. However, the recognition can be reached more quickly when normalizing the primary image than when not normalizing the primary image.

In the above described embodiment, the maximum light intensity of each correlation peak is utilized for normalization of each correlation peak; however, the total light amount or the average light amount of each correlation peak can be used for the normalization basis.

Figure 21:
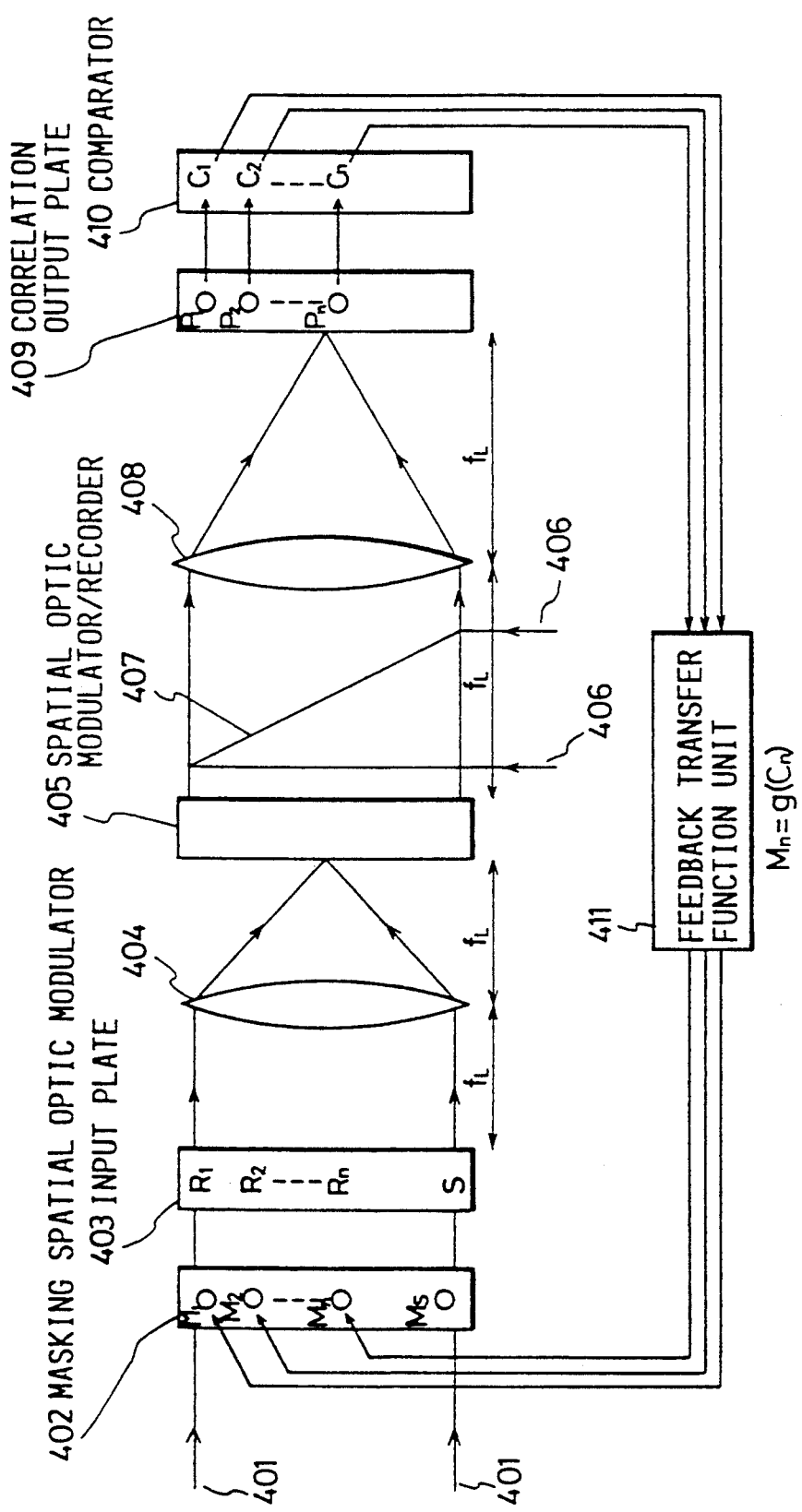
FIG. 21 is a schematic view of a fifth embodiment of the present invention.

FIG. 21 is a structural diagram showing a fifth embodiment of the present invention. The utilized Fourier spatial light modulator is of the reflective and light addressed type. A laser source 401, and an input plate 403 having thereon a joint image constitute means for converting the joint image composed of at least one reference image including an object reference image and at least one input image into a coherent image. A Fourier transform lens 404 constitutes means for Fourier transforming the coherent image to a joint Fourier image of the reference images and the input image. A liquid crystal spatial light modulator 405 constitutes means for converting the joint Fourier image into an intensity distribution image and for recording the same. A beam splitter 407 constitutes means for reading the intensity distribution image recorded on the liquid crystal spatial light modulator 405 by using a coherent reading light 406. A Fourier transform lens 408 and a CCD camera 409 constitute means for Fourier transforming the read coherent image of intensity distribution into a correlation image and for converting the same into a corresponding correlation image signal. A comparator 410 constitutes means for digitally processing the correlation image signal to determine two-dimensional correlation coefficients between the reference images and the input image. A feedback transfer function unit 411 and a masking liquid crystal light valve 402 constitute means for changing transmissivity (or reflectivity) of a section of the masking light valve 402 which covers the reference image in linear or nonlinear relation to the correlation coefficient.

For example, n number of reference images $R_1$-$R_n$ and one input image S are formed next to each other on the input plate 403. Further, the masking light valve 402 has sectional or local transmissivities $M_1$-$M_n$ corresponding to the respective reference images, and a local transmissivity Ms on a section corresponding to the input image. When the coherent incident light illuminates the input plate 403 through the masking light valve 402, the reference images and the input image are converted into a joint coherent image. In this initial state, $M_1 = \ldots = M_n = M_s$ is held. Therefore, the incident light intensity is uniform over the reference images and input image on the input plate 403.

The coherent image is Fourier transformed by the Fourier transform lens 404 such that the resulting Fourier image is recorded on the spatial light modulator 405 in the form of light intensity distribution. A coherent reading light 406 is reflected by the beam splitter 407 and then illuminates the spatial light modulator or recorder 405 to read the written intensity distribution of the joint Fourier image in to the form of a coherent Fourier image. This Fourier image is again Fourier transformed by the second Fourier transform lens 408 to form a correlation image on the image detector 409 along the correlation output plane. The output correlation image contains n pairs of correlation peaks $P_1$-$P_n$. Each light intensity or peak level of the respective correlation peaks $P_1$-$P_n$ represents each two-dimensional cross-correlation coefficient between the input image S and the respective reference images $R_1$-$R_n$ on the input plate 403. In such construction, the input plate 403 is disposed on a front focal plane of the first Fourier lens 404, and the spatial light modulator 405 is disposed on a back focal plane thereof. Further, the spatial light modulator 405 is disposed on a front focal plane of the second Fourier lens 408, and the correlation image detector 409 is disposed on a back focal plane thereof.

The correlation image detector 409 converts the correlation output image containing the correlation peaks into the corresponding correlation image signal, which is then processed by the comparator 410 to determine the light intensities of correlation peaks, thereby producing the two-dimensional cross-correlation coefficients $C_1$-$C_n$ between the input image and the respective reference images. In addition, these cross-correlation coefficients are normalized by the maximum cross-correlation coefficient.

These cross-correlation coefficients are fedback into the feedback transfer function unit 411 and are processed according to linear or nonlinear function g as follows:

$$Mn = g(Cn)$$

so as to determine or set the transmittances $M_1$-$M_n$ of the masking light valve 402. In this regard, the normalized cross-correlation coefficients $C_1$-$C_n$ and the transmittances $M_1$-$M_n$ have a value between 0 and 1. Therefore, the function g has a definition region and a value region within 0-1.

The masking modulator 402 is controlled to set its local transmittances $M_1$-$M_n$ corresponding to the respective reference images. By such operation, the light intensities of the beams illuminating the reference images $R_1$-$R_n$ are changed according to the values of two-dimensional cross-correlation coefficients obtained by the correlation processing. The transmissivity Ms corresponding to the input image is always set to $$Ms = \max(Mi),$$

where i runs from 1 to n.

In this subsequent state where the transmissivities of the masking light valve 402 are changed, again the incident light 401 is irradiated to effect the similar correlation processing to obtain the updated two-dimensional cross-correlation coefficients. These results are fedback through the feedback transfer function unit 411 to change the transmittances of the masking modulator 402.

In the above described construction, when a light intensity of one correlation peak is smaller than that of other peaks, the next light intensity of the beam irradiating the corresponding reference image is lowered through the feedback. In this state, the subsequent correlation processing is carried out such that the Fourier transform image of the reference image corresponding to that weak correlation peak becomes weaker and more unclear among the Fourier transform images recorded on the spatial light modulator 405. Consequently, the correlation peak level corresponding to that reference image further becomes weak. Thus, by iterating this feedback operation, the reference images which have small correlation to the input image is gradually masked by the masking light valve 402 such that the incident beams irradiating those irrelevant reference images are weakened, while only the correlation peak corresponding to the correct reference image can be extremely strengthened. Therefore, even if many correlation peaks are formed on the correlation image detector and they have small peak levels such as to be undermined by noises to make it impossible to recognize correctly in the initial state, the above described feedback can be iterated to effect the correct recognition.

By changing the form of the feedback transfer function, the relation can be suitably set between the two-dimensional cross-correlation coefficients $C_1$-$C_n$ and the local transmittances of the masking modulator 402. The feedback transfer function may include saturation type such as a sigmoid function, sinewave function and logarithmic function, and step type such as mono-stage step function and multistage step function, and any combination thereof. When changing the form of the feedback transfer function, the speed and accuracy of recognition can be improved. For example, when using the Heaviside unit function in the feedback transfer function unit 411, its threshold value may be suitably selected to effect complete masking of reference images corresponding to weak correlation peaks by single feedback operation, thereby achieving extremely quick recognition. On the other hand, if the threshold value is not propery set, the recognition is prolonged or is unable to be performed while iterating the feedback operation. Accordingly, the form of the feedback transfer function should be changed according to the condition of input image or the required condition of recognition.

In the above embodiment, the recording spatial light modulator 405 is comprised of the reflective and light addressed type; however, transmission type and electrically addressed type may be equally utilized.

FIG. 22 is a structural diagram showing a modification of the fifth embodiment of the present invention. In this embodiment, the reflective and light addressed liquid crystal light valve 425 is used as a Fourier spatial light modulator as in the FIG. 21 embodiment. A laser source 421, a beam expander 422, a beam splitter 423, a shutter 433 and an input plate 403 having thereon a joint image constitute means for converting the joint image composed of at least one reference image including an object reference image and at least one input image into a coherent image. A Fourier transform lens 404 constitutes means for Fourier transforming the coherent image to a joint Fourier image of the reference image and the input image. A liquid crystal light valve 425 constitutes means for converting the joint Fourier image into an intensity distribution image and for recording the same. Mirrors 431, 432 and polarizing beam splitter 426 constitute means for reading the intensity distribution image recorded on the liquid crystal light valve 425 by using a coherent light. A Fourier transform lens 408 and a CCD camera 427 constitute means for Fourier transforming the read coherent image of the intensity distribution into a correlation image and for converting the same into a corresponding correlation image signal. An A/D converter 428 and computer 429 constitute means for digitally processing the correlation image signal to determine two-dimensional correlation coefficients between the reference images and the input image. The computer 429, a D/A converter 430 and a masking liquid crystal light valve 424 constitute means for changing transmittance (or reflectivity) of a section of the masking light valve 424 which covers the reference image in linear or nonlinear relation to the correlation coefficient.

In such construction, a coherent light emitted from the laser 421 is expanded by the beam expander 422 and then divided into two light beams by the beam splitter 423. One of the divided light beams passes through the beam splitter 423, the shutter 433 and the masking light valve 424 and then illuminates a joint image of the input image and reference images arranged next to the input image on the input plate 403 so as to convert the joint image into a coherent image. This coherent image is Fourier transformed by the lens 404 to produce the joint Fourier image, which is detected and displayed on the liquid crystal light valve 425 in the form of an intensity distribution image.

On the other hand, the other divided light beam reflected from the beam splitter 423 is reflected by the mirrors 431, 432 and polarizing beam splitter 426 and then illuminates the liquid crystal light valve 425 from the back side. By this, the joint Fourier image displayed on the light valve 425 in the form of the light intensity distribution is converted into a corresponding coherent image and is then Fourier transformed by the lens 408 to produce a correlation image containing correlation peaks which can be detected by the CCD camera 427. In such construction, the input plate 403 is disposed on the front focal plane of the first Fourier transform lens 404 and the liquid crystal light valve 425 is disposed on the Fourier plane of the first Fourier transform lens 404.

Further, the liquid crystal light valve 425 is disposed on the front focal plane of the Fourier transform lens 408, and the CCD camera 427 is disposed on the Fourier plane thereof. The masking liquid crystal light valve 424 is disposed just before or after the input plate 403. The shutter 433 is controlled by the computer 429 to open only when recording the joint Fourier image in the form of light intensity distribution on the liquid crystal light valve 425 and to close at other times.

The CCD camera 427 outputs an analog signal representative of the correlation image, which is converted into a corresponding digital signal by an A/D converter 428. The computer 429 receives the digital signal and processes it to determine the correlation coefficient data according to the light intensity of the correlation peaks contained in the correlation image. The computer 429 is provisionally inputted with a feedback transfer function so that the computer calculates an output value thereof according to the correlation coefficient data to output a digital signal effective to operate the masking light valve 424. Namely, the digital signal is converted into a corresponding analog signal by a D/A converter 430 to drive the masking light valve 424.

As shown in FIG. 23, the joint image on the input plate is composed of a central input image and a plurality of peripheral reference images along a circle such that a distance is made equal between the input image and the respective reference images. In this case, 13 number of reference images are arranged. The masking light valve 424 is set completely transmissive in the initial state so as to uniformly illuminate each of reference and input images with a coherent light.

In the initial state, the CCD camera 427 detects a plurality of correlation peaks based on correlations between the input image and the respective reference images. For example in case of the FIG. 23 joint image, thirteen pairs of correlation peaks may be detected correspondingly to the thirteen reference images. In such case, the light intensity or level of the respective peaks is smaller than that of a correlation peak between a single reference image and a single input image, while noise increases to make it difficult to discriminate between peaks and noise to cause incorrect recognition.

Therefore, the analog correlation image signal output from the CCD camera 427 is converted into a digital signal by the A/D converter 428, and the computer 429 determines the maximum light intensity for each correlation peak as the peak level of each correlation peak. Each peak level is normalized by the greatest peak level among all of the peak levels, and the normalized values are feedback into the feedback transfer function unit. The feedback transfer function is represented, for example, by the following sigmoid function:

$$g(X) = [1 + \tanh((X-a)/X_0)]/2 \quad (1)$$

Figure 24:
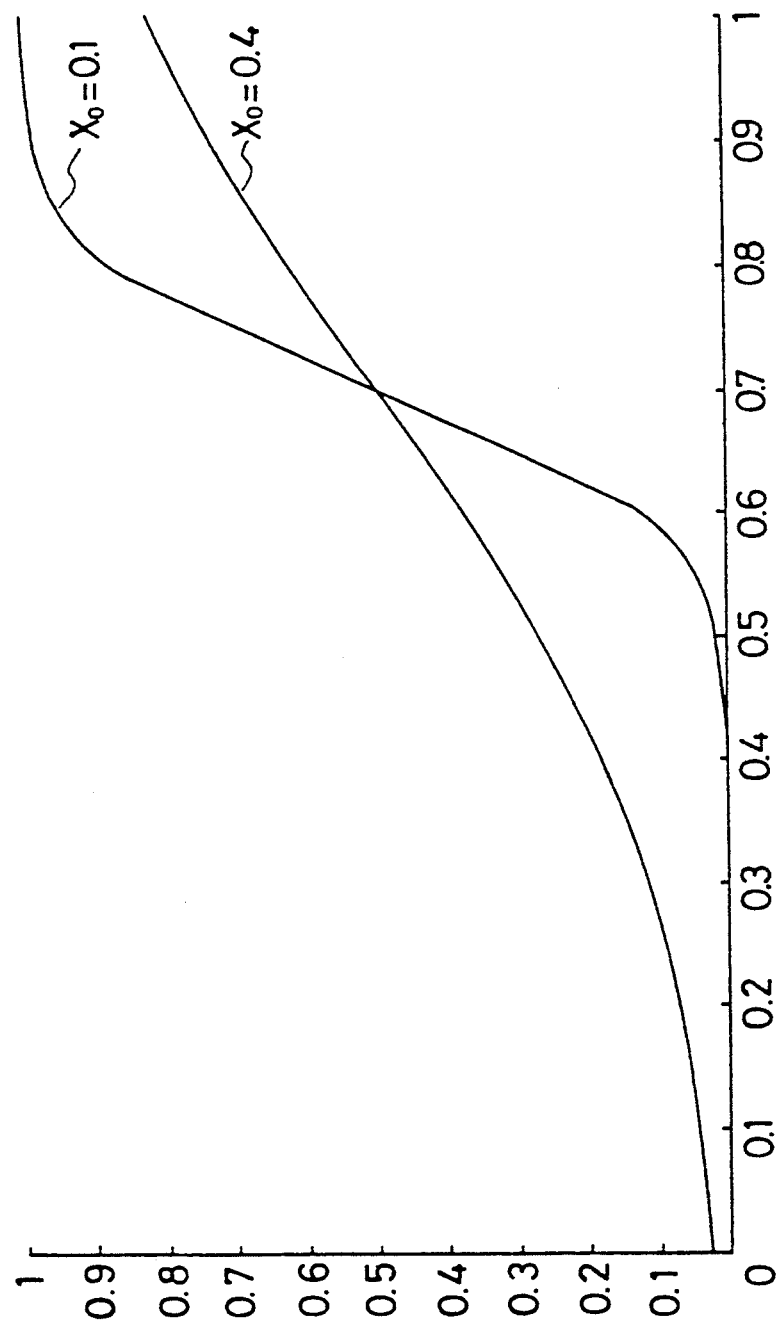
FIG. 24 is a graph showing a form of sigmoid function.

FIG. 24 shows this function where $a=0.7$ and $X_0=0.4, 0.1$.

When reducing the value of $x_0$, this function approaches the Heaviside unit function. The output value $g(x)$ of the feedback transfer function determines the local transmittance of a section of the masking liquid crystal light valve 424, which faces the corresponding reference image.

For example, as in the initial state where the FIG. 23 joint image is processed, the maximum correlation peak is obtained between the input image "E" and the particular reference image "E". Therefore, the other peak levels are normalized by this maximum peak to determine normalized peak levels $C_1-C_{12}$ for the remaining twelve reference images. Thus, the sectional transmittances of the masking light valve 424 is set to $$g(C_1), g(C_2), \ldots g(C_{12}).$$

According to these rates, the masking light valve 424 is operated to proportionally mask the respective reference images.

Then in the subsequent state after the adjustment or correction, the CCD camera 427 detects updated correlation peaks. Consequently to the correction, the correlation peaks are lowered for the reference images other than reference image "E" as compared to their initial peak levels because they are masked against the incident coherent light beam. On the other hand, since the reference image "E" is not masked, its peak level is boosted higher than its initial level. Then, the masking operation is again carried out according to the relative ratio of the update correlation peak levels. By iterating this operation, the plurality of correlation peaks are converged into a single pair and the remaining peaks disappear. In the final state, the non-correlative reference images are completely masked to thereby effect recognition of the input image.

Figure 25:
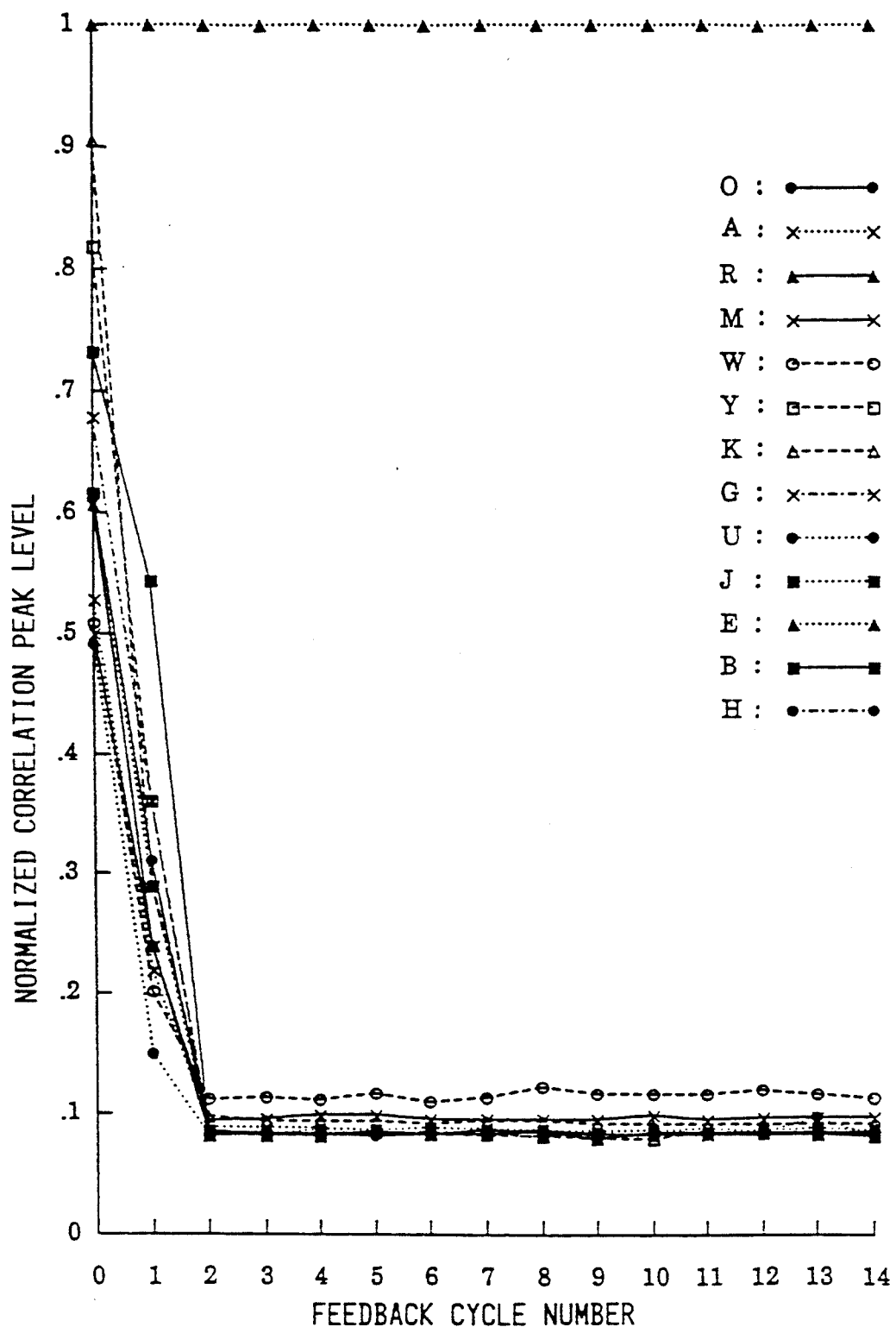
FIG. 25 is a graph showing the change of the normalized correlation peak levels in terms of the feedback number when using nonlinear feedback transfer function.
Figure 26:
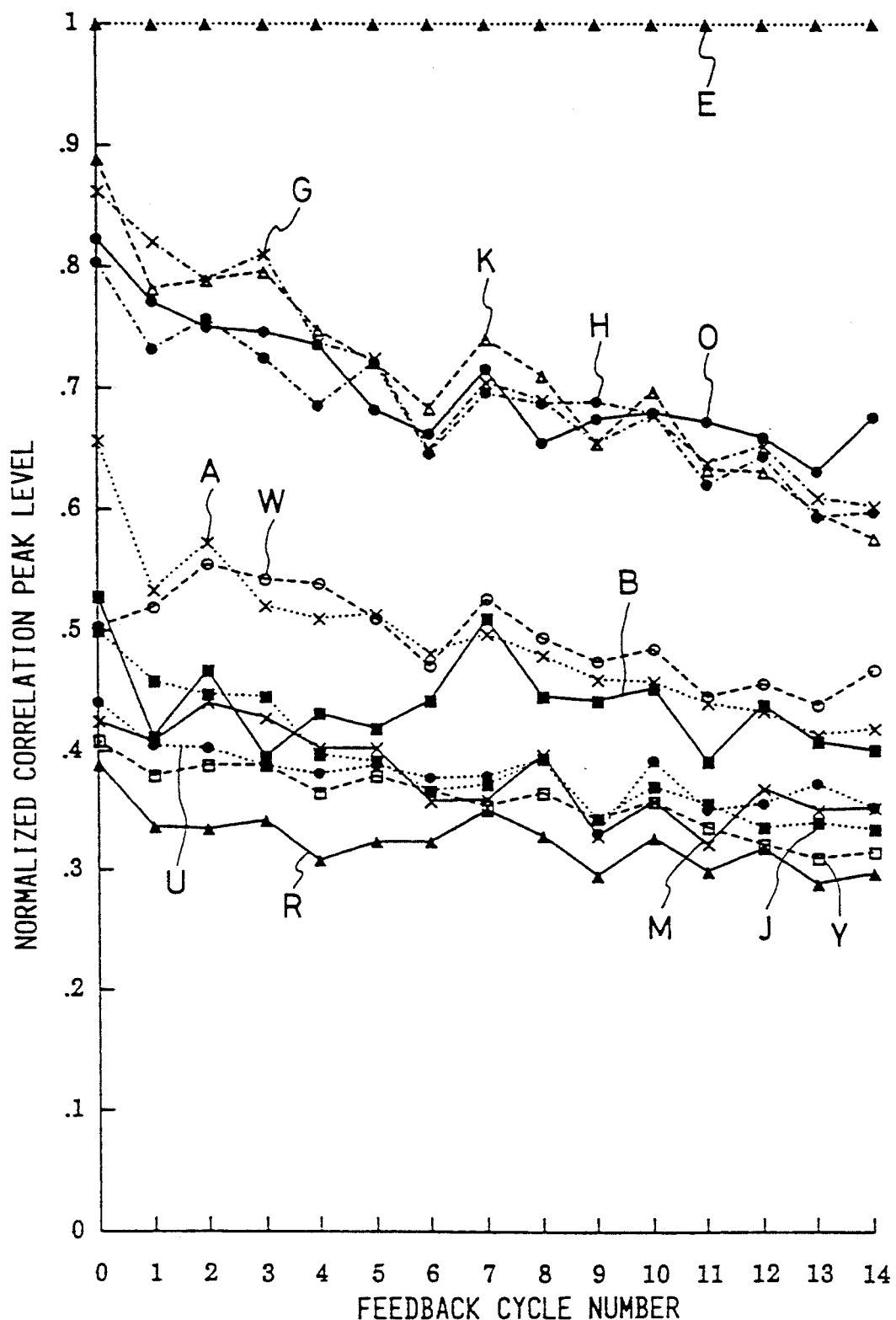
FIG. 26 is a graph showing the change of the normalized correlation peak levels in terms of the feedback number when using a linear feedback transfer function.

FIG. 25 shows the change in normalized correlation peak levels in terms of feedback number when using the sigmoid function indicated by the relation (1) as the feedback transfer function, where the parameters are set as $a=0.7$ and $x_0=0.1$ in the relation (1). Further, FIG. 26 shows change in normalized correlation peak levels in terms of feedback number when using linear feedback transfer function. As understood from the comparison between FIGS. 25 and 26, the correlation peak levels corresponding to the reference images other than "E" are quickly reduced while iterating the feedback operation.

In the above described embodiment, the maximum light intensity of each correlation peak is utilized for normalization of each correlation peak; however, total light amount or average light amount of each correlation peak can be used for the normalization basis. In the above embodiment, the sigmoid function is used as the feedback transfer function; however, Heaviside unit function or multi-stage step function may be utilized to achieve the same effect. In the above embodiment, the reflective light valve of the light addressed type is used as the Fourier image recorder; however, for example, transmission light valve such as BSO crystal ($Bi_{12}SiO_{20}$) spatial light modulator can be utilized to achieve the same effect.

Figure 27:
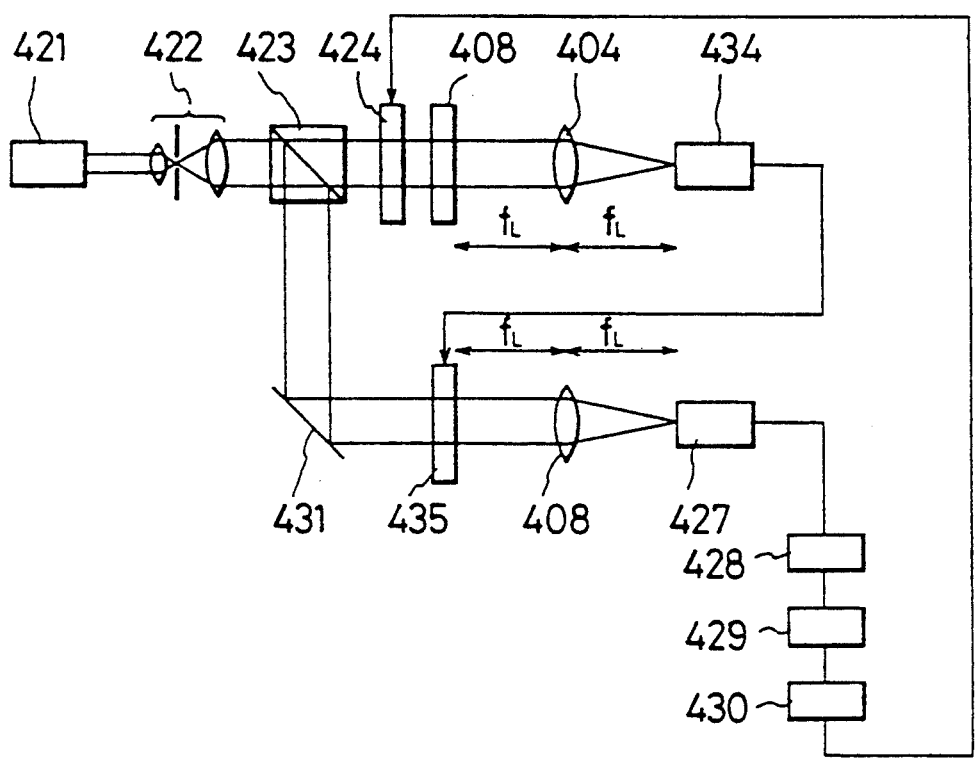
FIG. 27 is a structural diagram showing another modification of the fifth embodiment of the invention.

Another modification of the fifth embodiment of the present invention is described in conjunction with FIG. 27. A CCD camera 434 and liquid crystal television 435 constitute means for converting the Fourier image into its intensity distribution image and for displaying the same. The joint primary image on the input plane 403 is Fourier transformed by the Fourier transform lens 404 in manner similar to the embodiments described before, and therefore their detailed description is eliminated. The Fourier image of the primary image is converted into a corresponding electric signal by the CCD camera 434, and this signal is fed into the liquid crystal television 435 to display intensity distribution of the Fourier image. One of light beams divided by the beam splitter 423 is reflected by mirror 431 and then illuminates the liquid crystal television 435. By this, the intensity distribution of the Fourier image can be converted into a coherent image. This coherent image is again Fourier transformed by Fourier transform lens 408 and the resulting image is detected by the CCD camera 427 to produce a correlation image signal indicative of correlation peaks. Subsequent process can be carried out in a manner similar to the embodiments described before.

In the present embodiment, the Fourier image is displayed on the liquid crystal television 435. However, the joint Fourier image can be recorded on a light valve of the light addressed type by using a scanning optical system such as a laser scanner. In the embodiment, the laser beam from the laser source 401 is divided by means of beam splitter 423; however, a pair of laser sources can be utilized instead of beam splitter.

As described above, according to the fifth aspect of the invention, the feedback transfer function can be set to a desired form. Therefore, the optimum form of the feedback transfer function can be suitaby selected depending on various conditions such as the number of reference images and input images in the primary image, degree of similarity between the reference and input images, and accuracy or speed needed for recognition and measurement, thereby enabling the recognition and measurement featuring both the accuracy and fast performance.

Figure 28:
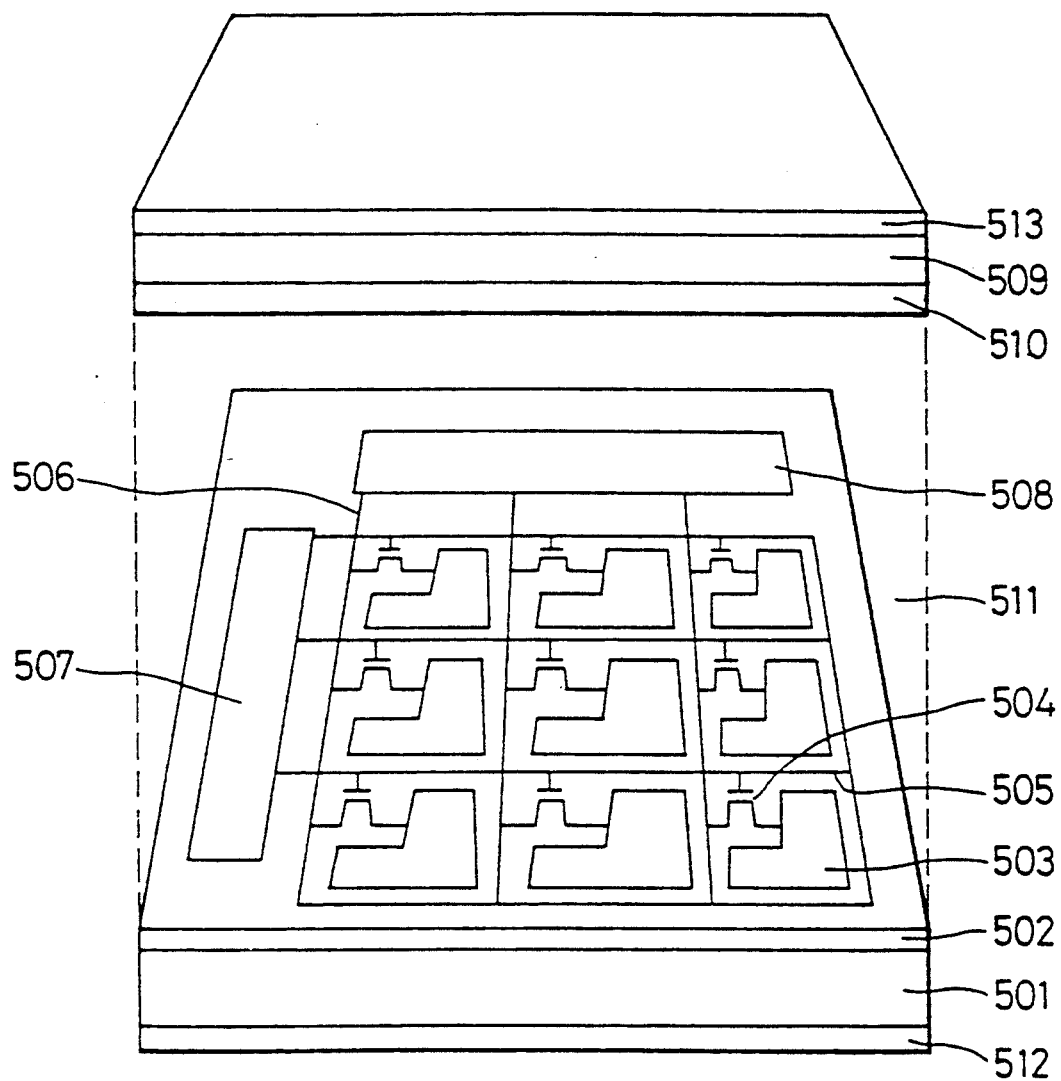
FIG. 28 is an exploded view of a liquid crystal light valve utilized in the invention apparatus.

FIG. 28 shows another type of the liquid crystal light valve of the electrically addressed type. The light valve can be also utilized for a masking light valve, recording light valve, primary image display and so on in the inventive apparatus. The light valve is comprised of a substrate 501 composed, for example, of qualtz glass plate which is called SOI (silicon on insulator) structure. A silicon single crystal film 502 is formed on the substrate 501. A plurality of picture elements are formed in the silicon single crystal film 502 in matrix array. Each picture element or pixel is comprised of a picture electrode 503 and a corresponding switching element 504 in the form of a field effect insulating gate type transistor. The transistor has a source electrode connected to the corresponding picture electrode, a drain electrode connected to a signal line 506 and a gate electrode connected to a scanning line 505. Each scanning line 505 is connected to a scanning circuit 507 so as to scan each row of the switching elements 504. Each signal line 506 is connected to a signal circuit 508 so as to drive a scanned switching elements 504 according to an image signal to select a corresponding picture element. The switching elements 504, scanning circuit 507 and driving circuit 508 can be concurrently formed on the silicon single crystal film 502 by LSI technology to thereby fabricate μm-order of picture elements. An upper substrate 509 is disposed on the lower substrate 501 in spaced relation therefrom, and is formed with a counter electrode 510 on its inner face. A liquid crystal layer 511 of TN or ferroelectric type is sandwiched between the lower and upper substrates 501 and 509. The liquid crystal layer 511 is locally activated between the counter electrode 510 and a selected picture element to effect switching of incident light through a pair of polarizers 512 and 513.

In this embodiment, the silicon single crystal film 502 is advantageously formed by bonding of silicon single crystal wafer and quartz glass plate with each other and by lapping and polishing of the wafer to enable application of LSI fabrication technology to the substrate directly.

What is claimed is:

1. An optical pattern recognition apparatus for applying optical correlation processing using coherent light to a two-dimensional image so as to automatically recognize and measure a particular pattern, comprising: means for converting at least three images comprised of at least one reference image and at least one input image into a joint coherent image; means for Fourier transforming the joint coherent image to produce a joint Fourier transform image of each said reference image and each said input image; means including a spatial light modulator of the light addressed type for converting the joint Fourier transform image into an intensity distribution image and recording the same on the spatial light modulator; means for reading the image recorded in the spatial light modulator of the light addressed type by using coherent light; means for Fourier transforming the read image into a correlation image; means for converting the correlation image into correlation signals; means for processing the correlation, signals to determine a correlation coefficient between each said reference image and each said input image; and means including another spatial light modulator adjacent to a plane of each said reference image for changing the intensity of the coherent light passing through the plane of each said reference image before the joint coherent image is Fourier transformed again by the means for Fourier transforming the joint coherent image, the intensity of the coherent light being changed according to the determined correlation coefficient between each said reference image and each said input image to thereby effect correction of the correlation coefficient through feedback.

2. An optical pattern recognition apparatus for applying optical correlation processing using coherent light to a two-dimensional image so as to automatically recognize and measure a particular pattern, comprising: means for converting at least three images comprised of at least one reference image and at least one input image into a joint coherent image; means for Fourier transforming the joint coherent image to produce a joint Fourier transform image of each said reference image and each said input image; means for converting the joint Fourier transform image into an intensity distribution signal; means including a spatial light modulator of the electrically addressed type receptive of the intensity distribution signal for recording an intensity distribution image corresponding to the intensity distribution signal; means for reading the image recorded in the spatial light modulator of the electrically addressed type by using coherent light; means for Fourier transforming the read image into a correlation image; means for converting the correlation image into correlation signals; means for processing the correlation signals to determine a correlation coefficient between each said reference image and each said input image; and means including another spatial light modulator adjacent to a plane of each said reference image for changing an intensity of the coherent light passing through the plane of each said reference image before the joint coherent image is Fourier transformed again by the means for Fourier transforming the joint coherent image, the intensity of the coherent light being changed according to the determined correlation coefficient between each said reference image and each said input image to thereby effect correction of the correlation coefficient through feedback.

3. An optical pattern recognition apparatus for applying optical correlation processing using coherent light to a two-dimensional image so as to automatically recognize and measure a particular pattern, comprising: means for converting at least three images comprised of at least one reference image and at least one input image into a joint coherent image; means for Fourier transforming the joint coherent image to produce a joint Fourier transform image of each said reference image and each said input image; means including a binary spatial light modulator for converting the joint Fourier transform image into a binarized intensity distribution image and for recording the binarized intensity distribution image on the binary spatial light modulator; means for reading the binarized intensity distribution image on the spatial light modulator by using coherent light; means for further Fourier transforming the read binarized intensity distribution image into a correlation image; means for converting the correlation image into correlation signals; means for processing the correlation signals to determine a correlation coefficient between at least one said reference image and at least one said input image; and means including another spatial light modulator adjacent to a plane of each said reference image for changing an intensity of the coherent light passing through the plane of each said reference image before the joint coherent image is Fourier transformed again by the means for Fourier transforming the joint coherent image, the intensity of the coherent light being changed according to the determined correlation coefficient between each said reference image and each said input image to thereby effect correction of the correlation coefficient through feedback.

4. An optical pattern recognition apparatus according to claim 3; wherein the means for converting the joint Fourier transform image into the binarized intensity distribution image and for recording the binarized intensity distribution image on the binary spatial light modulator includes an image sensor for detecting the joint Fourier transform image to convert the same into a corresponding electrical signal, means for binarizing the electrical signal, and a spatial light modulator to the electrically addressed type for recording the binarized intensity distribution image according to the electrical signal.

5. An optical pattern recognition apparatus according to claim 3; wherein the means for converting the joint Fourier transform image into the binarized intensity distribution image and for recording the binarized intensity distribution image on the binary spatial light modulator includes a binary spatial light modulator of the light addressed type containing a ferroelectric liquid crystal having bistable memory characteristic between optical reflectivity and an applied voltage for receiving the joint Fourier transform image and for directly binarizing the same to record the binarized results.

6. An optical pattern recognition apparatus for applying optical correlation processing using coherent light to two-dimensional image so as to automatically recognize and measure a particular pattern, comprising: means for converting at least three images comprised of at least one reference image and at least one input image into a joint coherent image; means for Fourier transforming the joint coherent image to produce a joint Fourier transform image of each said reference image and each said input image; means including a spatial light modulator for converting the joint Fourier transform image into an intensity distribution image and recording the same on the spatial light modulator; means for reading the intensity distribution image recorded on the spatial light modulator by using coherent light; means for Fourier transforming the read intensity distribution image into a correlation image; means for converting the correlation image into correlation signals; means for processing the correlation signals to determine a correlation coefficient between each said reference image and each said input image; and means including a masking device adjacent to a plane of each said reference image for changing the intensity of the coherent light passing through the plane of each said reference image before the joint coherent image is Fourier transformed again by the means for Fourier transforming the joint coherent image, the intensity of the coherent light being changed according to one of (1) a segment ratio of each said reference image and each said input image, and (2) an incident light intensity component through each said reference image, so as to normalize a Fourier transform intensity for each said reference image.

7. An optical pattern recognition apparats according to claim 6; wherein the masking device comprises an electrically addressed spatial light modulator disposed before or after the reference image plane.

8. An optical pattern recognition apparatus according to claim 7; wherein the masking device includes means for controlling light intensity of a coherent beam passing through each section of the reference image plane according to the determined correlation coefficient to thereby effect correction of the correlation coefficient through feedback.

9. An optical pattern recognition apparatus according to claim 6; wherein the means for converting the joint Fourier transform image into the intensity distribution image and for recording the same on the spatial light modulator includes means for converting the joint Fourier transform image into a binarized intensity distribution image and for displaying the binarized intensity distribution image on a binary spatial light modulator.

10. An optical pattern recognition apparatus according to claim 7; wherein the means for converting the joint Fourier transform image into the intensity distribution image and for recording the same on the spatial light modulator includes means for converting the joint Fourier transform image into a binarized intensity distribution image and for displaying the binarized intensity distribution image on a binary spatial light modulator.

11. An optical pattern recognition apparatus according to claim 8; wherein the means for converting the joint Fourier transform image into the intensity distribution image and for recording the same on the spatial light modulator includes means for converting the joint Fourier transform image into a binarized intensity distribution image and for displaying the binarized intensity distribution image on a binary spatial light modulator.

12. An optical pattern recognition apparatus according to claim 9; wherein the means for converting the joint Fourier transform image into the binarized intensity distribution image and for recording the same includes a binary spatial light modulator of the light addressed type having ferroelectric liquid crystal which exhibits bistable memory characteristic of optical reflectivity in response to an applied voltage.

13. An optical pattern recognition apparatus for applying optical correlation processing using coherent light to a two-dimensional image so as to automatically recognize and measure a particular pattern, comprising: means for converting at least three images comprised of at least one reference image and at least one input image into a joint coherent image; means for Fourier transforming the joint coherent image to produce a joint Fourier transform image of each said reference image and each said input image; means including a spatial light modulator for converting the joint Fourier transform image into an intensity distribution image and for recording the intensity distribution image on the spatial light modulator; means for reading the intensity distribution image recorded on the spatial light modulator by using coherent light; means for Fourier transforming the read intensity distribution image into a correlation image; means for converting the correlation image into correlation signals; means for processing the correlation signals to determine a correlation coefficient between each said reference image and each said input image; and means including a masking spatial light modulator adjacent to a plane of each said reference image for changing an intensity of the coherent light passing through the plane of each said reference image before the joint coherent image is Fourier transformed again by the means for Fourier transforming the joint coherent image, the intensity of the coherent light being changed in a nonlinear relation to the determined correlation coefficient between each said reference image and each said input image to thereby effect correction of the correlation coefficient through feedback.

14. An optical pattern recognition apparatus according to claim 3; wherein the other spatial light modulator adjacent to a plane of the reference images includes means for changing the intensity of the coherent light passing through the plane of the reference images in nonlinear relation to the determined correlation coefficient to thereby effect correction of the correlation coefficient through feedback.

15. An optical pattern recognition apparatus according to claim 8; wherein the masking device adjacent to a plane of the reference images includes means for changing an intensity of the coherent light passing through the plane of the reference images in a nonlinear relation to the determined correlation coefficient to thereby effect correction of the correlation coefficient through feedback.

16. An optical pattern recognition apparatus according to claim 13; wherein the nonlinear relation can be represented by one of a saturation function, a step function having at least one stage, and the combination thereof.

17. An optical pattern recognition apparatus according to claim 15; wherein the nonlinear relation can be represented by one of a saturation function, a step function having at least one stage, and the combination thereof.

18. An apparatus for optical pattern recognition by iterative processing, comprising: first converting means for converting at least three images comprised of at least one reference image and at least one input image into a joint image; first transforming means for Fourier transforming the joint image into a Fourier transform image; recording means for perceiving and recording the Fourier transform image as an intensity distribution image; reading means for reading the intensity distribution image from the recording means and Fourier transforming the read image into a correlation image; computing means receptive of the correlation image for determining a correlation coefficient for each said reference image correlated with each said input image and producing a correlation signal in response thereto; feedback means operable with each iteration for changing the light intensity of each said reference image before the joint image is Fourier transformed again by the first transforming means, the light intensity being changed in response to the correlation signal so as to correspondingly alter the perception of each said reference image by said recording means to thereby effect optical pattern recognition to each said input image by repetitively reducing with each iteration the perception of each said reference image that does not have the highest corresponding correlation coefficient.

19. An apparatus for optical pattern recognition according to claim 18; wherein said recording means includes binarizing means for recording the Fourier transform image as a binary intensity distribution image.

20. An apparatus for optical pattern recognition according to claim 18; wherein said recording means includes a first spatial light modulator of the light addressed type having ferroelectric liquid crystal for recording the Fourier transform image as a binary intensity distribution image.

21. An apparatus for optical pattern recognition according to claim 20; wherein said feed-back means includes a second spatial light modulator receptive of the correlation signal for changing the light intensity of each reference image.

22. An apparatus for optical pattern recognition according to claim 22; wherein said computing means includes normalizing means for determining a normalized value for each respective said correlation coefficient based on the size of each said reference image, and said computing means produces the correlation signal in response to the normalized value and the correlation coefficient corresponding to each said reference image.

23. An apparatus for optical pattern recognition according to claim 22; wherein said computing means includes transfer function computing means to determine the correlation signal based on a saturation transfer function.

24. An apparatus for optical pattern recognition according to claim 22; wherein said computing means includes transfer function computing means to determine the correlation signal based on a step transfer function.

25. An apparatus for optical pattern recognition according to claim 22; wherein said computing means includes transfer function computing means to determine the correlation signal based on a combination of a step transfer function and a saturation transfer function.

26. An apparatus for optical pattern recognition according to claim 18; wherein the first converting means includes means for converting a plurality of reference images each having a light intensity and a size, and said at least one input image, into a joint image.

27. An apparatus for optical pattern recognition according to claim 18; wherein the recording means includes means for recording the Fourier transform image as an analog intensity distribution image.

* * * * *